US012732110B2

(12) United States Patent
Adragna

(10) Patent No.: US 12,732,110 B2
(45) Date of Patent: Sep. 8, 2026

(54) SELF-ADJUSTING BOOTSTRAP RECHARGE SYSTEM IN DUAL-SWITCH FLYBACK CONVERTERS

(71) Applicant: STMicroelectronics International N.V., Geneva (CH)

(72) Inventor: Claudio Adragna, Monza (IT)

(73) Assignee: STMicroelectronics International NV, Geneva (CH)

( * ) Notice: Subject to any disclaimer, the term of this patent is extended or adjusted under 35 U.S.C. 154(b) by 404 days.

(21) Appl. No.: 18/386,945

(22) Filed: Nov. 3, 2023

(65) Prior Publication Data

US 2025/0149990 A1 May 8, 2025

(51) Int. Cl.
*H02M 3/335* (2006.01)
*H02M 1/00* (2006.01)

(52) U.S. Cl.
CPC ....... *H02M 3/3353* (2013.01); *H02M 1/0006* (2021.05); *H02M 1/0054* (2021.05); *H02M 3/33523* (2013.01)

(58) Field of Classification Search
CPC ............. H02M 3/3353; H02M 1/0054; H02M 3/33523; H02M 1/0006
See application file for complete search history.

(56) References Cited

U.S. PATENT DOCUMENTS 7,145,316 B1 * 12/2006 Galinski, III ........... H02M 1/08 323/283
7,538,583 B2 * 5/2009 Bryson ............. H03K 17/6871 326/88
7,609,036 B2 * 10/2009 Bartolo ................. H02M 3/157 323/283
8,174,248 B2 * 5/2012 Mavencamp ....... H02M 3/1588 323/225
8,207,720 B2 * 6/2012 Tang ..................... H02M 3/156 323/901
8,502,511 B1 * 8/2013 Kung .................. H02M 3/1588 323/272
8,836,300 B2 * 9/2014 Sohma ................ H02M 3/1588 323/272
9,312,773 B2 * 4/2016 Li ........................ H03K 17/063
9,577,506 B1 * 2/2017 Chin .................... H03K 17/063
10,361,620 B2 * 7/2019 Lee ....................... H02M 3/155
10,587,262 B1 * 3/2020 Morini ............. H03K 17/04206
11,133,797 B1 * 9/2021 Wu .................... H03K 17/6871
(Continued)

*Primary Examiner* — Yusef A Ahmed
(74) *Attorney, Agent, or Firm* — Slater Matsil, LLP

(57) ABSTRACT

According to an embodiment, a converter is provided. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is delayed after a duration from a transitioning of the first control signal to turn OFF the high-side switch, wherein the delay is automatically adjusted by detecting a condition associated with the converter, wherein the delay begins in response to a voltage at the floating ground node being less than zero.

20 Claims, 12 Drawing Sheets

(56) References Cited

U.S. PATENT DOCUMENTS 11,791,708 B2 * 10/2023 Li ..................... H02M 3/158 363/21.01
2002/0079948 A1 * 6/2002 Moriconi ............ H02M 3/1588 327/390
2005/0057239 A1 * 3/2005 Fowler ................ H03K 17/063 323/282
2006/0152951 A1 * 7/2006 Fagnani ................ H02M 3/335 363/49
2007/0046275 A1 * 3/2007 Shirai .................. H03K 17/165 323/284
2007/0159150 A1 * 7/2007 Hosokawa ........... H03K 17/687 323/285
2007/0182395 A1 * 8/2007 Sakai .................. H02M 3/1588 323/283
2007/0268729 A1 * 11/2007 Choi ................. H02M 3/33571 363/132
2008/0018311 A1 * 1/2008 Sakai ................... H03K 17/063 327/333
2008/0100378 A1 * 5/2008 Bernacchia ......... H02M 7/5388 327/589
2008/0290841 A1 * 11/2008 Chang ..................... H02J 7/865 320/166
2010/0072967 A1 * 3/2010 Kamishinbara ....... H02M 3/158 323/284
2011/0018613 A1 * 1/2011 Wang .................. H02M 3/1588 327/530
2012/0126765 A1 * 5/2012 Stone .................. H02M 3/1588 323/283
2012/0230059 A1 * 9/2012 Adragna ........... H02M 3/33507 363/16
2013/0106374 A1 * 5/2013 Ball .................... H02M 3/1588 323/271
2014/0217959 A1 * 8/2014 Chen ......................... H02J 7/00 323/311
2016/0011610 A1 * 1/2016 Hayashi ............... H03K 17/162 323/280
2016/0043072 A1 * 2/2016 Vielemeyer .......... H10D 84/811 327/109
2016/0276933 A1 * 9/2016 Saito .............. H03K 19/017509
2017/0054369 A1 * 2/2017 Chin ......................... G05F 1/61
2017/0110971 A1 * 4/2017 Degen ............... H02M 3/33571
2017/0133929 A1 * 5/2017 Matsuki .................. H02M 1/32
2017/0302178 A1 * 10/2017 Bandyopadhyay ..... H02M 1/08
2020/0021199 A1 1/2020 Phadke
2020/0027957 A1 * 1/2020 Umemoto .............. H10D 30/60
2021/0083572 A1 * 3/2021 Yen ......................... H02M 1/08
2021/0126538 A1 * 4/2021 Puia ...................... H02M 3/158
2021/0152075 A1 * 5/2021 Akahane ........ H03K 19/018521
2021/0167774 A1 * 6/2021 Karasawa ............. H02M 3/015
2021/0184576 A1 * 6/2021 Cattani ................... H02M 1/08
2021/0391795 A1 * 12/2021 Gandhi ............... H02M 3/1582
2021/0408921 A1 12/2021 Yang et al.
2022/0006450 A1 * 1/2022 Fontana .................. H02M 1/08
2022/0393567 A1 * 12/2022 Bognanni ............. H02M 3/158
2023/0040189 A1 * 2/2023 Fontana ........... H03K 19/00315
2023/0059963 A1 * 2/2023 Yoon ................... H02M 1/0006
2023/0078379 A1 * 3/2023 Kulsangcharoen .......................... H02M 7/5388 327/390
2023/0100060 A1 * 3/2023 Balasubramanian ........................ H02M 1/0006 327/536
2023/0129526 A1 * 4/2023 Fukushima ........ H03K 17/6871 327/108
2024/0072662 A1 * 2/2024 Amin .................. H02M 3/1588
2024/0097555 A1 * 3/2024 Ptacek .................... H02M 1/08
2024/0128856 A1 * 4/2024 D'Souza ................. H02M 1/32
2024/0204777 A1 * 6/2024 Hara ....................... H02M 3/07
2025/0088104 A1 * 3/2025 Rossi .................... H02M 1/088

* cited by examiner

SELF-ADJUSTING BOOTSTRAP RECHARGE SYSTEM IN DUAL-SWITCH FLYBACK CONVERTERS

TECHNICAL FIELD

The present disclosure generally relates to power electronics and, in particular embodiments, to a self-adjusting bootstrap recharge system in dual-switch flyback converters.

BACKGROUND

The dual-switch flyback converter is a design topology used in power electronics. However, just like any other electronic system, it grapples with specific technical challenges that need addressing for optimal performance. One of the prominent issues at the forefront is ensuring that the bootstrap capacitor maintains an adequate charge under all operating conditions, particularly to drive the high-side switch of the converter.

To initiate the charge of the bootstrap capacitor, the low-side switch can be turned ON for a specific duration—an approach mirroring the techniques used in half-bridge structures. By activating low-side switch, the potential at the floating ground (FGND) node is essentially zero. Facilitating the charging of the bootstrap capacitor through the low-side switch and the primary winding of the converter's transformer.

As the converter operates and switches, the recharging of the bootstrap capacitor comes into play. The presence of substantial energy from the leakage inductance of the transformer can draw the potential at the floating ground (FGND) close to zero resulting in the recharging of the bootstrap capacitor. This is further amplified when the recirculation diodes of the converter are activated during the OFF states of the high-side and low-side switches. The voltage shift across the primary winding, upon the deactivation of high-side and low-side switches, is equivalent to the sum of the reflected voltage ($V_R$) and the voltage spike due to leakage inductance ($V_x$). However, a potential challenge arises if the combined value of the reflected voltage ($V_R$) and the voltage spike due to leakage inductance ($V_x$) falls short of the input voltage ($V_{IN}$). Under such circumstances, the potential at the floating ground (FGND) node doesn't reach zero.

The integrity of the converter's operation hinges on the adequate recharging of bootstrap capacitor. When the energy from the leakage inductance is insufficient to drive the potential at the floating ground (FGND) node close to zero, the bootstrap capacitor cannot recharge. Over time, this culminates in an inability to activate the high-side switch, derailing the operation of the converter.

SUMMARY

Technical advantages are generally achieved by embodiments of this disclosure, which describe a self-adjusting bootstrap recharge system in dual-switch flyback converters.

A first aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is delayed after a duration from a transitioning of the first control signal to turn OFF the high-side switch, wherein the delay is automatically adjusted by detecting a condition associated with the converter, wherein the delay begins in response to a voltage at the floating ground node being less than zero.

A second aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is based on detecting a condition associated with the converter after a transitioning of the first control signal to turn OFF the high-side switch.

A third aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is based on a programmable delay after a transitioning of the first control signal to turn OFF the high-side switch, the programmable delay being a function of a maximum current flowing through a transformer of the converter.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity. Variations or modifications described in one of the embodiments may also apply to others. Further, various changes, substitutions, and alterations can be made herein without departing from the spirit and scope of this disclosure as defined by the appended claims. While the inventive aspects are described primarily in the context of dual-switch flyback converters, it should also be appreciated that these inventive aspects may also apply to other types of power converters.

Figure 1:
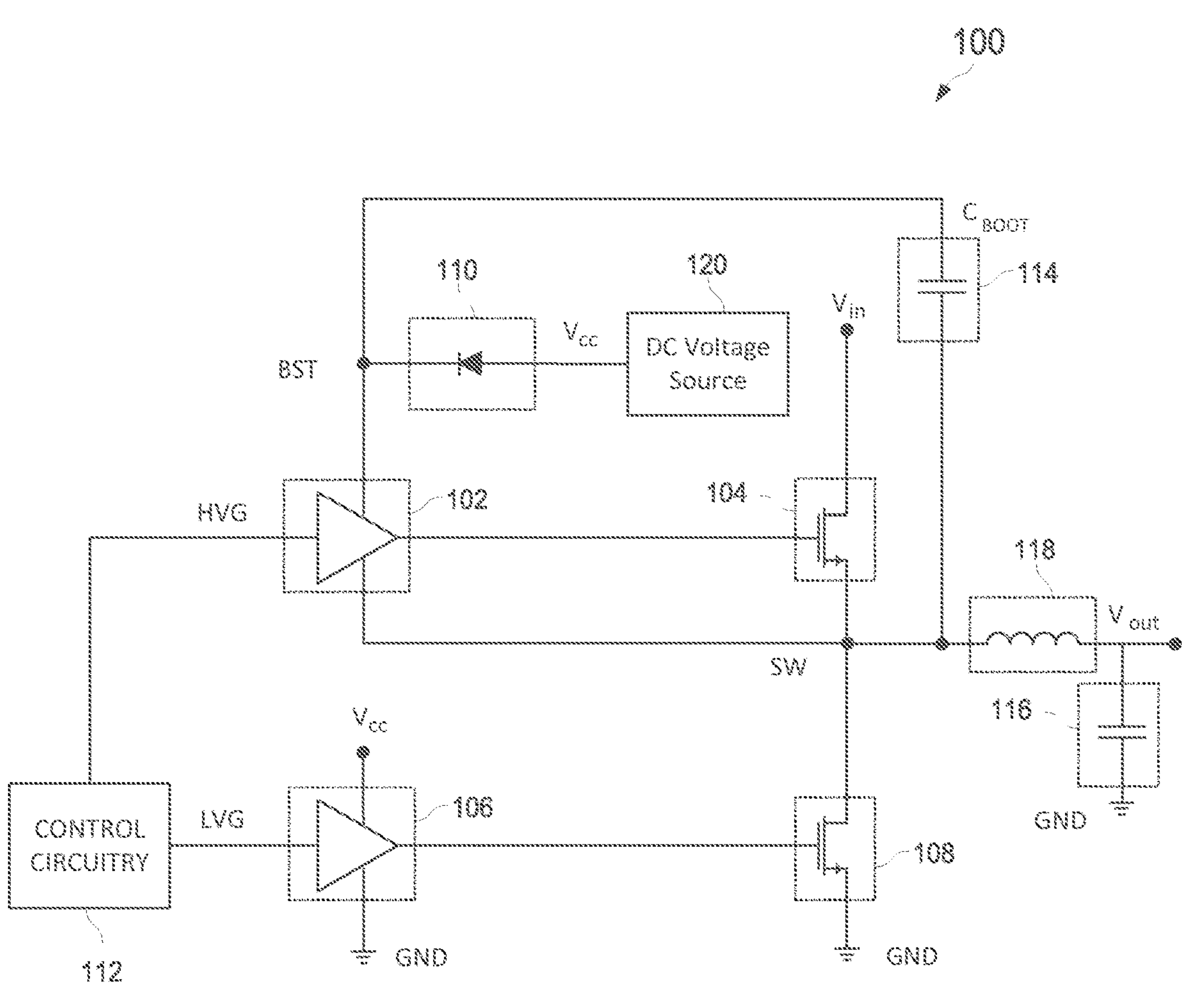
FIG. 1 is a schematic of a conventional DC-DC converter.

FIG. 1 illustrates a schematic of a conventional DC-DC converter 100. The DC-DC converter 100 includes high-side drive circuitry 102, a high-side transistor 104, low-side drive circuitry 106, a low-side transistor 108, a bootstrap diode 110, a bootstrap capacitor ($C_{BOOT}$) 114, an output capacitor 116, an inductor 118, and a DC Voltage Source 120.

In the DC-DC converter 100, the control circuitry 112 alternately drives the high-side transistor 104 and the low-side transistor 108 ON and OFF, respectively, via the high-side signal (HVG) and the low-side signal (LVG) to create a desired output voltage ($V_{out}$). The DC Voltage Source 120 is configured to generate a regulated voltage ($V_x$), provided to the bootstrap diode 110 and the low-side drive circuitry 106. In embodiments, the regulated voltage ($V_{cc}$) is generated by the DC Voltage Source 120 using an auxiliary winding (not shown) coupled to the transformer, a rectification diode (not shown), and a buffer capacitor (not shown) to obtain a substantially DC voltage.

The output capacitor 116 and inductor 118 form an LC circuit at the output of the DC-DC converter 100 to produce the desired DC output voltage.

The bootstrap diode 110 and the bootstrap capacitor ($C_{BOOT}$) 114 form a bootstrap circuit to generate a boosted voltage (i.e., greater or equal to the minimum gate-source voltage ($V_{gs}$) of the high-side transistor 104) to efficiently drive the high-side transistor 104 by the high-side drive circuitry 102.

Generally, the low-side transistor 108 is directly controlled using control circuitry 112 coupled to the input of the low-side drive circuitry 106. However, directly controlling the high-side transistor 104 by control circuitry 112 becomes more challenging because the source terminal of the high-side transistor ($Q_1$) 104, when the high-side transistor 104 is implemented, for example, as an n-channel Metal-Oxide-Semiconductor Field-Effect Transistor (MOSFET) in a buck converter, is not connected to a ground reference.

During the ON state of the low-side transistor 108 (i.e., OFF phase of the converter), the switching node (SW) is connected to ground. The bootstrap capacitor ($C_{BOOT}$) 114 is charged to a voltage equal to the difference between the regulated voltage ($V_{cc}$) and the threshold voltage of the bootstrap diode 110 as current flows through the bootstrap diode 110 from the regulated voltage ($V_{cc}$). The bootstrap diode 110 is forward-biased and will charge the bootstrap capacitor ($C_{BOOT}$) 114 to a voltage slightly below the regulated voltage ($V_{cc}$).

During the ON state of the high-side transistor 104 (i.e., the ON phase of the converter), the gate voltage of the high-side transistor 104 must be raised above the source voltage level by at least a threshold voltage to ensure it turns entirely ON. However, since the source of the high-side transistor 104 is not connected to the ground reference, it is challenging to drive it directly from the control circuitry 112.

The bootstrap circuit comes into play during this ON state of the high-side transistor 104. The control circuitry 112 asserts the high-side signal (HVG), which allows the voltage stored in the charged bootstrap capacitor ($C_{BOOT}$) 114 to be applied to the control terminal of the high-side transistor 104 through the high-side drive circuitry 102. Applying the voltage from the bootstrap capacitor ($C_{BOOT}$) 114 to the control terminal of the high-side transistor 104 makes the gate-source voltage ($V_{gs}$) sufficient to turn ON the high-side transistor 104.

Once the high-side transistor 104 is ON, the voltage ($V_{FGND}$) at the floating ground (FGND) node is connected to the input power supply ($V_{in}$). The cathode of the bootstrap diode 110 (bootstrap power supply) is equal to the sum of the input power supply ($V_{in}$) and the charge stored across the bootstrap capacitor ($C_{BOOT}$) 114. The bootstrap diode is reverse-biased, and the bootstrap capacitor is disconnected from the regulated voltage ($V_{cc}$). The cycle is continuously repeated as the high-side transistor 104 turns OFF, and the bootstrap capacitor ($C_{BOOT}$) 114 gets recharged during the ON state of the low-side transistor 108.

Figure 2:
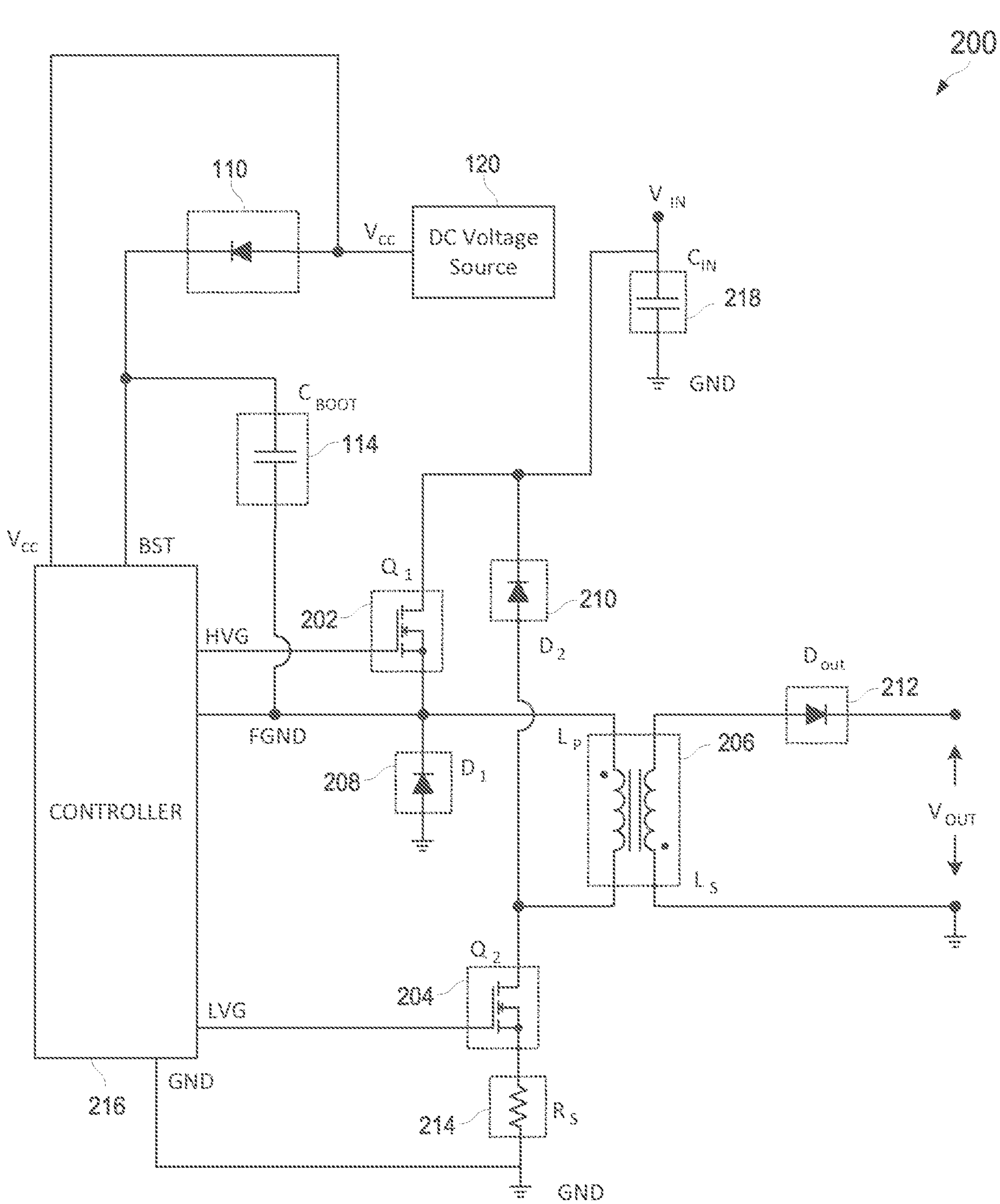
FIG. 2 is a schematic of a dual-switch flyback converter.

FIG. 2 illustrates a schematic of a dual-switch flyback converter 200. Dual-switch flyback converter 200 includes a high-side switch (Q1) 202, a low-side switch (Q2) 204, a transformer 206, a first diode (D1) 208, a second diode (D2) 210, an output diode (DOUT) 212, a sense resistor (RS) 214, a control circuitry 216, an input capacitor (CIN) 218, the bootstrap diode 110, the bootstrap capacitor (CBOOT) 114, and the DC Voltage Source 120. As shown, the regulated voltage (Vcc) is generated by the DC Voltage Source 120 and is provided to the control circuitry 216.

Each of the high-side switch ($Q_1$) 202 and the low-side switch ($Q_2$) 204 is typically an n-channel Metal-Oxide-Semiconductor Field-Effect Transistor (MOSFET). Transformer 206, with a primary side ($L_p$) and a secondary side ($L_S$) facilitates the energy transfer from the input to the output via magnetic coupling. The source terminal of the high-side switch ($Q_1$) 202 is coupled to the secondary side ($L_S$) of the transformer 206 at the floating ground (FGND) node. The drain terminal of the low-side switch ($Q_2$) 204 is coupled to the first terminal of the primary side ($L_p$) of transformer 206.

The high-side switch ($Q_1$) 202 and the low-side switch ($Q_2$) 204 are the principal switches in the dual-switch flyback converter 200. Their synchronous operation-turning on and off simultaneously-manages the current flow in the primary side ($L_P$) of the transformer 206.

The first diode ($D_1$) 208 and the second diode ($D_2$) 210 act as recirculation diodes, channeling energy from the leakage inductance of the transformer 206 back to the input capacitor ($C_{IN}$) 218. This efficient energy utilization, especially in cases with significant transformer leakage, bolsters the overall efficiency of the dual-switch flyback converter 200. The input capacitor ($C_{IN}$) 218 serves to filter and stabilize the input voltage ($V_{IN}$). The output diode ($D_{OUT}$) 212 functions as an output rectification diode to ensure that current only flows to the output when the high-side switch ($Q_1$) 202 and the low-side switch ($Q_2$) 204 are in the OFF state.

The sense resistor ($R_S$) 214 is coupled to the drain terminal of the low-side switch ($Q_2$) 204 and is used to ensure the safe operation of the dual-switch flyback converter 200 and is typically used for current mode control. When the low-side switch ($Q_2$) 204 is activated, the current flowing through it also traverses the sense resistor ($R_S$) 214. This results in a voltage drop across the sense resistor ($R_S$) 214, directly proportional to the current passing through the low-side switch ($Q_2$) 204. By monitoring this voltage, the control circuitry 216 can precisely gauge the magnitude of the inductor current in real time. This sensed voltage, combined with the feedback signal coming from the secondary side, allows the control circuitry 216 to modulate the on-time of the high-side switch ($Q_1$) 202 and the low-side switch ($Q_2$) 204, ensuring that the peak primary current is the one exactly required to provide the power demanded by the load while keeping the output voltage regulated at the desired value. As a result, current mode control, facilitated by the sense resistor ($R_S$) 214, enhances the performance of the dual-switch flyback converter 200 by providing rapid response to load and line changes, improving transient behavior, and ensuring safer operation by preventing potential overcurrent scenarios.

The control circuitry 216 includes an input terminal coupled to the output of the bootstrap diode 110 and is configured to drive the high-side switch ($Q_1$) 202 using a high-side gate control signal (HVG). The operation of the high-side switch ($Q_1$) 202 is based on the same principles as used to drive the high-side transistor 104 of the DC-DC converter 100 using the bootstrap diode 110 and the bootstrap capacitor ($C_{BOOT}$) 114. The control circuitry 216 is configured to drive the low-side switch ($Q_2$) 204 using a low-side gate control signal (LVG).

Operationally, when the high-side switch ($Q_1$) 202 and the low-side switch ($Q_2$) 204 are in the active state (i.e., ON state), energy accumulates in the windings of the primary side ($L_P$) of the transformer 206. At this juncture, output diode (Dour) 212 remains inactive, preventing any energy transfer to the output side. The operation shifts when the high-side switch ($Q_1$) 202 and the low-side switch ($Q_2$) 204 are deactivated (i.e., OFF state). The energy stored in the windings of the primary side ($L_P$) of transformer 206 moves to the secondary side ($L_S$) of transformer 206, activating the output diode (Dour) 212 and driving energy to the output.

Due to the non-ideal characteristics of transformer 206, leakage inductance arises because not all the magnetic field produced by the primary winding ($L_P$) is coupled with the secondary winding ($L_S$) of transformer 206. Instead, some of this field is "leaked" outside, which can be schematized by an uncoupled inductance that is in series with the winding of the primary side ($L_P$). Leakage inductance can pose challenges in the operation of the flyback converter, especially during the switch-off phase.

The dual-switch flyback converter 200 is a modification of the standard flyback converter. In a standard flyback converter with a single switch, when the switch turns off, the energy stored in the leakage inductance has nowhere to go, leading to voltage spikes. These spikes can exceed the rated voltage of the components, potentially damaging them. To address this, a resistor, often termed a "snubber resistor" in a resistor-diode-capacitor (RDC) clamp circuit provides a safe path for the energy stored in the leakage inductance to dissipate, thereby protecting the circuit components from potentially harmful voltage spikes. By connecting the RDC clamp across the windings of the primary side ($L_P$), the energy stored in the leakage inductance can be "burned off" or dissipated as heat in the snubber resistor when the switch is turned off.

However, while this method effectively clamps voltage spikes and protects the circuit, it's not the most efficient solution because the energy in the leakage inductance is not reused but simply wasted as heat. This leads to an increase in the thermal load and decreases the overall efficiency of the standard flyback converter.

In the dual-switch flyback converter 200, instead of using the resistor-diode-capacitor (RDC) clamp circuit to dissipate the extra energy as heat, the extra energy during the deactivated state of the high-side switch ($Q_1$) 202 and the low-side switch ($Q_2$) 204 is stored in the input capacitor ($C_{IN}$) 218. During the OFF state of the high-side switch ($Q_1$) 202 and the low-side switch ($Q_2$) 204, the extra voltage across the leakage inductance typically exceeds the input voltage ($V_{IN}$), such that the first diode ($D_1$) 208 and the second diode ($D_2$) 210 become forward biased. This results in the energy stored in the leakage inductance being transferred to the input capacitor ($C_{IN}$) 218. The charging and discharging of the input capacitor ($C_{IN}$) 218 during the different cycles of the dual-switch flyback converter 200 improve efficiency by avoiding the wastage as heat in the standard flyback converter with a single switch.

Further, with the voltage swing across the high-side switch ($Q_1$) 202 and the low-side switch ($Q_2$) 204 effectively split in half compared to single-switch flyback converter designs, capacitive switching losses (i.e., equal to $CV^2$) are minimized in a dual-switch flyback converter 200.

As discussed above, the voltage shift across the windings of the primary side ($L_P$), upon the deactivation of the high-side switch ($Q_1$) 202 and the low-side switch ($Q_2$) 204, is equivalent to the sum of the reflected voltage ($V_R$) and the voltage spike due to leakage inductance ($V_x$). Thus, the voltage ($V_{FGND}$) at the floating ground (FGND) node fails to reach zero if the combined value falls short of the input voltage ($V_{IN}$). When the energy from the leakage inductance is insufficient to drive the voltage ($V_{FGND}$) at the floating ground (FGND) node close to zero, the bootstrap capacitor ($C_{BOOT}$) 114 cannot recharge. Over a few cycles, this results in an inability to activate the high-side switch ($Q_1$) 202, disrupting the operation of the dual-switch flyback converter 200.

Figures 3, 4:
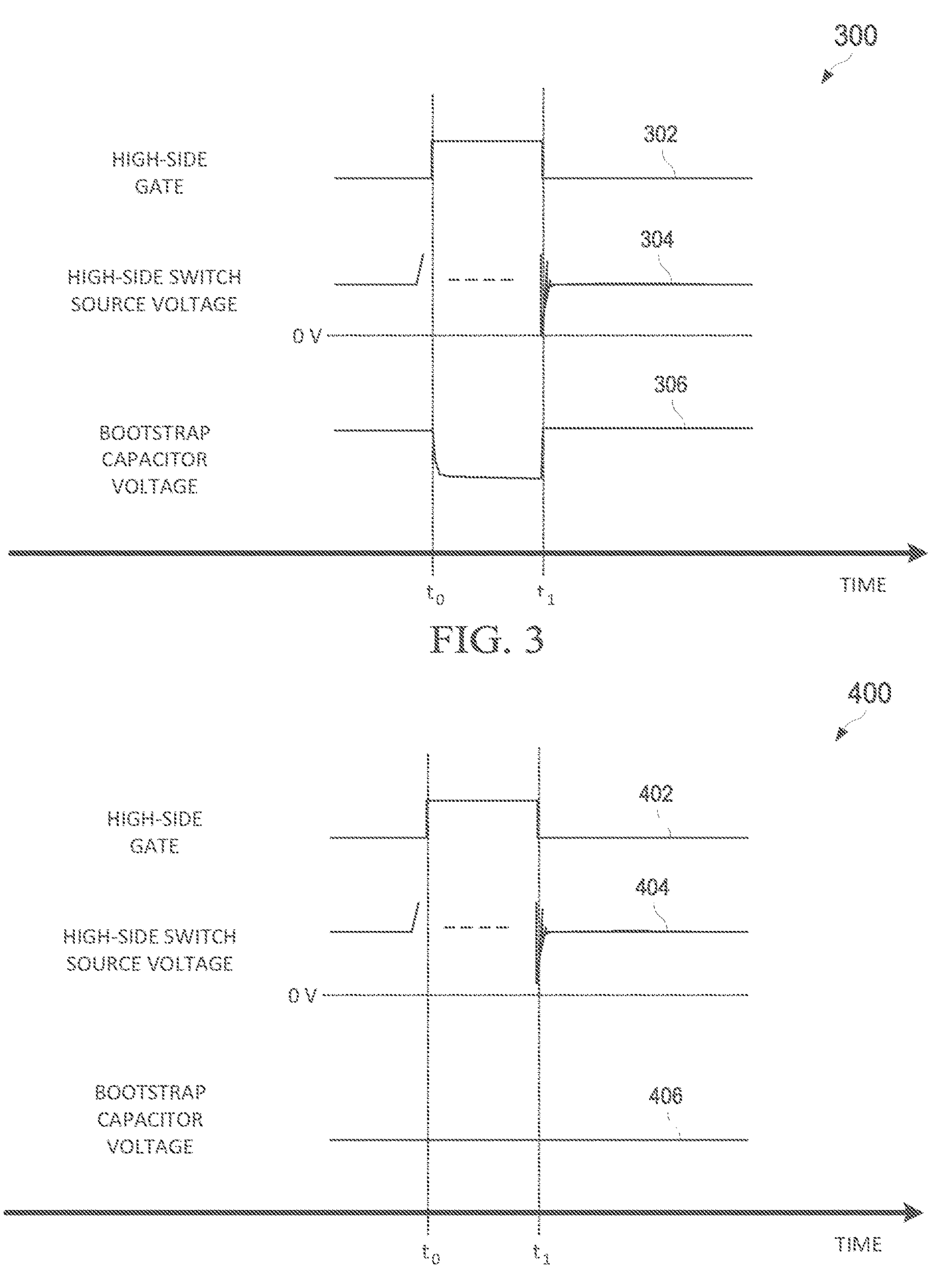
FIG. 3 is a set of waveforms corresponding to an example operation of the dual-switch flyback converter where the bootstrap capacitor ($C_{BOOT}$) is recharged.
FIG. 4 is a set of waveforms corresponding to an example operation of the dual-switch flyback converter where the bootstrap capacitor ($C_{BOOT}$) is not recharged.

FIG. 3 illustrates a set of waveforms 300 corresponding to an example operation of the dual-switch flyback converter 200 where the bootstrap capacitor ($C_{BOOT}$) 114 is recharged. Waveforms 300 include the high-side gating signal 302, the source voltage 304 of the high-side switch ($Q_1$) 202, and the charge voltage 306 at the bootstrap capacitor ($C_{BOOT}$) 114.

The high-side gating signal 302 drives the high-side switch ($Q_1$) 202. In embodiments, the high-side gating signal 302 is at a logic level high when the high-side switch ($Q_1$) 202 is in the ON state and at a logic level low when the high-side switch ($Q_1$) 202 is in the OFF state.

At time to, the high-side gating signal 302 transitions from a logic level low to a logic level high. Accordingly, the high-side switch ($Q_1$) 202 is activated (it is worth reminding that, simultaneously, the low-side switch ($Q_2$) 204 is also turned ON). The charge voltage 306 at the bootstrap capacitor ($C_{BOOT}$) 114 drops in value at time to. The bootstrap capacitor ($C_{BOOT}$) 114 is slightly discharged to drive the high-side switch ($Q_1$) 202 because of the electric charge that is transferred from the bootstrap capacitor ($C_{BOOT}$) 114 to the gate capacitance of the high-side switch ($Q_1$) 202.

At time $t_1$, the high-side gating signal 302 transitions from a logic level high to a logic level low. Accordingly, the high-side switch ($Q_1$) 202 is deactivated. The charge voltage 306 at the bootstrap capacitor ($C_{BOOT}$) 114 increases in value at time $t_1$. This is because when the high-side switch ($Q_1$) 202 is turned OFF, there is sufficient energy for the voltage ($V_{FGND}$) at the floating ground (FGND) node to go to zero for the bootstrap capacitor ($C_{BOOT}$) 114 to recharge.

FIG. 4 illustrates a set of waveforms 400 corresponding to an example operation of the dual-switch flyback converter 200 where the bootstrap capacitor ($C_{BOOT}$) 114 is not recharged. Waveforms 400 include the high-side gating signal 402, the source voltage 404 of the high-side switch ($Q_1$) 202, and the charge voltage 406 at the bootstrap capacitor ($C_{BOOT}$) 114.

The high-side gating signal 402 drives the high-side switch ($Q_1$) 202. In embodiments, the high-side gating signal 402 is at a logic level high when the high-side switch ($Q_1$) 202 is in the ON state and at a logic level low when the high-side switch ($Q_1$) 202 is in the OFF state.

At time to, the high-side gating signal 402 transitions from a logic level low to a logic level high. Accordingly, the high-side switch ($Q_1$) 202 is activated. Again, the bootstrap capacitor ($C_{BOOT}$) 114 is slightly discharged to drive the high-side switch ($Q_1$) 202 because of the electric charge that is transferred from the bootstrap capacitor ($C_{BOOT}$) 114 to the gate capacitance of the high-side switch ($Q_1$) 202.

At time $t_1$, the high-side gating signal 302 transitions from a logic level high to a logic level low. Accordingly, the high-side switch ($Q_1$) 202 is deactivated. In contrast to the charge voltage 306 at the bootstrap capacitor ($C_{BOOT}$) 114, the charge voltage 406 at the bootstrap capacitor ($C_{BOOT}$) 114 does not increase. This is because the source voltage 404 of the high-side switch ($Q_1$) 202, unlike the source voltage 304 of the high-side switch ($Q_1$) 202, does not reach zero. Accordingly, the bootstrap capacitor ($C_{BOOT}$) 114 will be discharged cycle after cycle until it fails to provide sufficient voltage at time to, and the high-side switch ($Q_1$) 202 cannot turn ON.

Conventional solutions to address this problem include (i) the use of an auxiliary transformer winding and (ii) the use of a drive transformer instead of the bootstrap topology. In the first case, the bootstrap capacitor ($C_{BOOT}$) 114 is still used, but an auxiliary winding is coupled to the windings of the primary side ($L_P$). When the low-side switch ($Q_2$) 204 is turned ON, the voltage across the auxiliary winding is positive, which allows the recharging of the bootstrap capacitor ($C_{BOOT}$) 114 through the auxiliary winding. While the auxiliary winding technique offers some benefits, it presents multiple challenges. On the upside, the absence of a drive transformer can potentially simplify the design. However, the first approach results in higher power dissipation, which can lead to inefficiencies in the system. Additionally, the first conventional solution exhibits poor standby performance. The complexity of the transformer in this setup is higher, which can complicate the design process and potentially affect reliability. Lastly, this design finds it challenging to manage a wide range for the output voltage ($V_{OUT}$), which could restrict its application in meeting modern power requirements, such as those of universal serial bus (USB) power delivery (PD).

In the second solution, a drive transformer is used with a standard flyback controller, where a winding is connected to its gate-drive output, and windings are added to the gate side of each of the high-side and low-side switches, plus a handful of passive components needed for proper operation. On the positive side, this method boasts low power dissipation, making the system more energy-efficient. The standby performance of this setup is also improved compared to the first solution, ensuring that the system remains reliable even in idle or low-load conditions. However, adding a drive transformer, while offering these advantages, also means increasing the number of components, potentially complicating assembly and maintenance.

Figure 5:
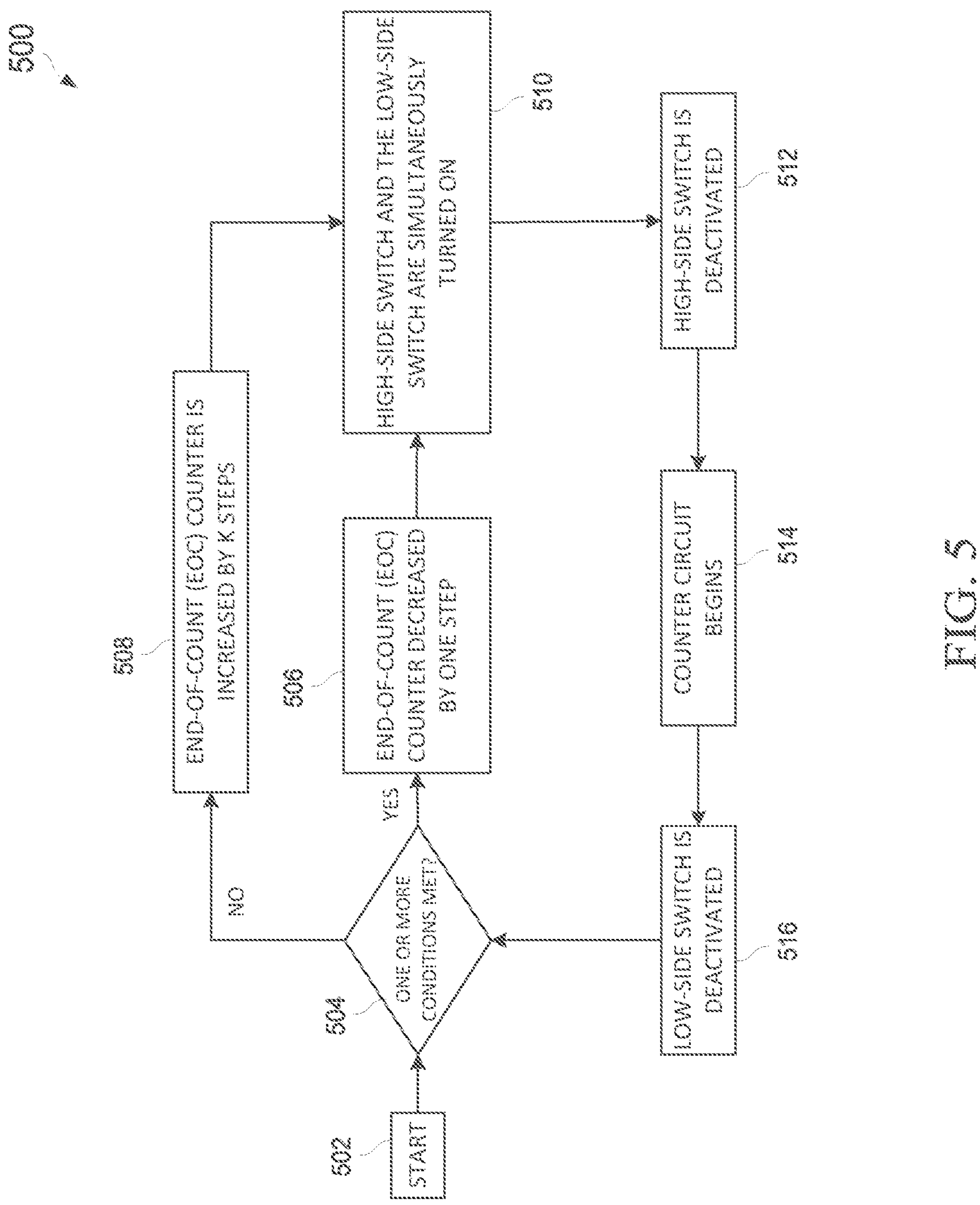
FIG. 5 illustrates a flow chart of an embodiment method for operating the dual-switch flyback converter.

FIG. 5 illustrates a flow chart of an embodiment method 500 for operating the dual-switch flyback converter 200. In embodiments, to ensure the voltage ($V_{FGND}$) at the floating ground (FGND) node goes to zero, the low-side switch ($Q_2$) 204 is deactivated after the high-side switch ($Q_1$) 202 is deactivated with a delay. It is noted that all steps outlined in the flow chart are not necessarily required and can be optional. Further, changes to the arrangement of the steps, removal of one or more steps and path connections, and addition of steps and path connections are similarly contemplated.

Generally, when the low-side switch ($Q_2$) 204 and the high-side switch ($Q_1$) 202 are simultaneously deactivated, the voltage across the windings of the primary side ($L_P$) reverses. This causes a drop in the voltage at the source terminal of the high-side switch ($Q_1$) 202 and an increase in voltage at the drain terminal of the low-side switch ($Q_2$) 204. The reverse voltage between the two terminals of the windings of the primary side ($L_P$) is equal to the sum of the reflected voltage ($V_R$) and the voltage spike due to leakage inductance ($V_x$). Assuming the low-side switch ($Q_2$) 204 and the high-side switch ($Q_1$) 202 are simultaneously deactivated, each terminal moves by $$\frac{V_R + V_X}{2}$$

centered on $$\frac{V_{IN}}{2},$$

where $V_{IN}$ is the input voltage.

In response to the low-side switch ($Q_2$) 204 remaining activated for a duration after the high-side switch ($Q_1$) 202 is deactivated, the input current goes to zero (i.e., no alternation of operation), and the drain voltage of the low-side switch ($Q_2$) 204 stays at zero. This causes the entire voltage swing to be on the source terminal of the high-side switch ($Q_1$) 202 (i.e., floating ground (FGND) node), which in turn causes the voltage ($V_{FGND}$) at the floating ground (FGND) node to go below zero. Accordingly, the bootstrap capacitor ($C_{BOOT}$) 114 is recharged. The voltage ($V_{FGND}$) at the floating ground (FGND) node is stopped from going too far below zero as the low-side switch ($Q_2$) 204 is deactivated by the first diode ($D_1$) being forward-biased, which clamps voltage ($V_{FGND}$) at the floating ground (FGND) node to, for example, at −1 V.

Advantageously, this allows the bootstrap capacitor ($C_{BOOT}$) 114 to be recharged regardless of the operating conditions. Further, the solution does not require a drive transformer, and no additional external pins are required, resulting in reduced component count and cost compared to the conventional solutions.

To intelligently control the delay between the turning OFF of the high-side switch ($Q_1$) 202 and the turning OFF of the low-side switch ($Q_2$) 204 to allow the voltage ($V_{FGND}$) at the floating ground (FGND) node to only go slightly below zero, a closed-loop adjustment operation is added to the dual-switch flyback converter 200. This addresses the delay variations based on circuit parameters (e.g., parasitic capacitances, reverse voltage ($V_R$), leakage inductance, etc.) and load conditions of the converter, since setting a fixed delay for all variations is not feasible.

At step 502, the closed-loop adjustment operation begins. At step 504, one or more conditions are checked. A first condition (Condition A) corresponds to the voltage across the bootstrap capacitor ($C_{BOOT}$) 114 being greater than a first threshold voltage ($V_{TH1}$). This can be represented as: if $V_{BST}>V_{TH1}\Rightarrow$Condition A, where $V_{BST}$ is the voltage across the bootstrap capacitor.

A second condition (Condition B) corresponds to a difference between the regulated voltage ($V_{cc}$) and the voltage across the bootstrap capacitor ($C_{BOOT}$) 114 being less than a second threshold voltage ($V_{TH2}$). This can be represented as: if $(V_{CC}-V_{BST})<V_{TH2}\Rightarrow$Condition B.

A third condition (Condition C) corresponds to the voltage at the voltage ($V_{FGND}$) at the floating ground (FGND) node being less than a third threshold voltage ($V_{TH3}$) for $\tau_1$ seconds within a $\tau_2$ second period immediately after the high-side switch ($Q_1$) 202 is turned OFF. This can be represented as: if $V_{FGND}<V_{TH3}\Rightarrow$Condition C, where $V_{FGND}$ is the voltage at the floating ground (FGND) for $\tau_1$ seconds within the $\tau_2$ second period. In embodiments, $\tau_1$ equals 100 nanoseconds (ns). In embodiments, $\tau_2$ equals 300 ns.

In embodiments, the first threshold voltage ($V_{TH1}$), the second threshold voltage ($V_{TH2}$), and the third threshold voltage ($V_{TH3}$) are pre-determined and stored in the memory of the host device coupled to the controller circuitry 216. In embodiments, the first threshold voltage ($V_{TH1}$), the second threshold voltage ($V_{TH2}$), and the third threshold voltage ($V_{TH3}$) are determined using machine learning techniques based on load and component variation conditions. In embodiments, the first threshold voltage ($V_{TH1}$) is set to 8 Volts. In embodiments, the second threshold voltage ($V_{TH2}$) is set to 2 Volts. In embodiments, the third threshold voltage ($V_{TH3}$) is set to 1 Volt.

In embodiments, the satisfaction of Condition A, Condition B, Condition C, or any combination thereof is used to satisfy step 504. Thus, if Condition A, Condition B, Condition C, or any combination thereof is met, the operation moves to step 506; otherwise, the operation moves to step 508. In embodiments, the satisfaction of one of the conditions depends on the implementation used in the control IC. In embodiments, Condition A, Condition B, and Condition C, are alternative conditions.

At step 506, the End-of-Count (EoC) counter is decreased by one step. At step 508, the End-of-Count (EoC) counter is increased by k steps, where k is an integer greater than one. In embodiments, the value of k is between 2 and 6, inclusive.

Once the value of the End-of-Count (EoC) counter is set at steps 506 or 508, the high-side switch ($Q_1$) 202 and the low-side switch ($Q_2$) 204 are simultaneously turned ON at step 510.

At step 512, the high-side switch ($Q_1$) 202 is deactivated. In embodiments, the high-side switch ($Q_1$) 202 is deactivated when the peak inductor current reaches a value programmed by a control loop. In embodiments, the control loop regulates the output voltage ($V_{OUT}$) by adjusting the duty cycle of the high-side switch ($Q_1$) 202 and the low-side switch ($Q_2$) 204. In embodiments, a current sensor is used to measure the inductor current in real-time, which is fed to the control loop. Once the inductor current reaches the predetermined peak value, as set by the control loop, the high-side switch ($Q_1$) 202 is turned off. This action terminates the energy storage phase in the windings of the primary side ($L_P$) and initiates the energy transfer to the windings of the secondary side ($L_S$).

At step 514, a counter circuit begins until the End-of-Count (EoC) counter value is reached. At step 516, when the counter circuit ends, the low-side switch ($Q_2$) 204 is deactivated. Steps 504 through 516 are repeated for the next cycle. After a few cycles, the End-of-Count (EoC) counter value is set to a near-fixed value that allows the voltage ($V_{FGND}$) at the floating ground (FGND) node to reach zero.

Figure 6:
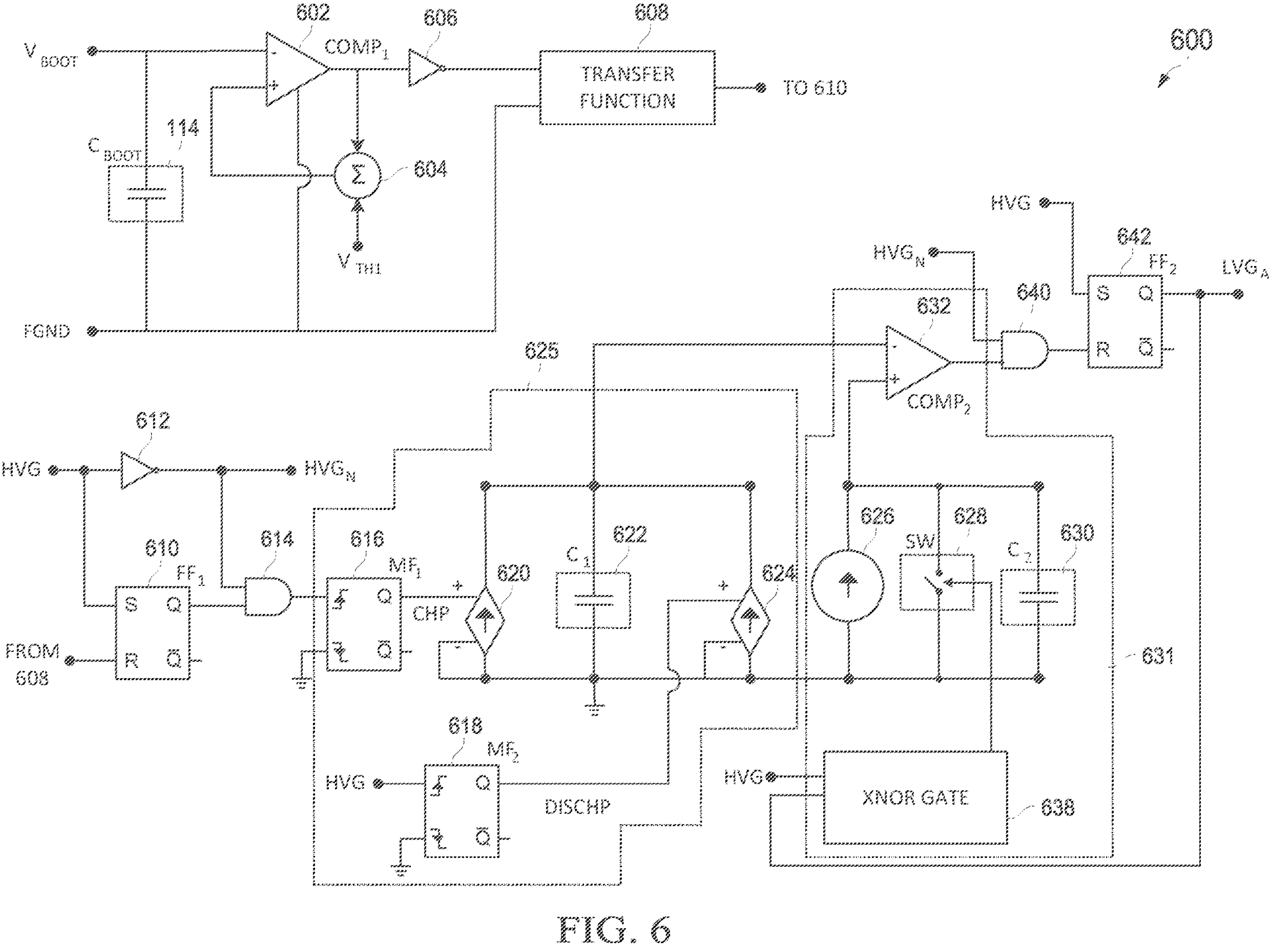
FIG. 6 is a schematic of an embodiment closed-loop adjustment circuit that can be implemented for Condition A of the method of FIG. 5 in the dual-switch flyback converter.

FIG. 6 illustrates a schematic of an embodiment closed-loop adjustment circuit 600 that can be implemented for Condition A of method 500 in the dual-switch flyback converter 200.

Closed-loop adjustment circuit 600 checks for Condition A, and automatically adjusts the delay time between the turning OFF of the high-side switch ($Q_1$) 202 and the low-side switch ($Q_2$) 204. The delay is decreased if the voltage across the bootstrap capacitor ($C_{BOOT}$) 114 is greater than the first threshold voltage ($V_{TH1}$). This can be represented as: if $V_{BST}>V_{TH1}\Rightarrow$decrease delay. And, the delay is increased if the voltage across the bootstrap capacitor ($C_{BOOT}$) 114 is less than the first threshold voltage ($V_{TH1}$). This can be represented as: if $V_{BST}<V_{TH1}\Rightarrow$increase delay.

The output ($LVG_A$) of the closed-loop adjustment circuit 600 is coupled to the gate terminal of the low-side switch ($Q_2$) 204 through, for example, a gate driver (not shown) to effectively turn OFF the low-side switch ($Q_2$) 204 after adjusting the delay through the closed-loop adjustment circuit 600 based on Condition A.

Closed-loop adjustment circuit 600 includes a first comparator ($COMP_1$) 602, an adder circuit 604, a first inverter 606, a level-shifter circuit 608, a first flip-flop ($FF_1$) 610, a second inverter 612, a first AND gate 614, a reverse current timer programming circuit 625, a reverse current timer circuit 631, a second AND gate 640, and a second flip-flop ($FF_2$) 842, which may (or may not) be arranged as shown. Closed-loop adjustment circuit 600 may include additional components not shown, such as filter circuits. The input of the closed-loop adjustment circuit 600 is coupled to the terminals of the bootstrap capacitor ($C_{BOOT}$) 114.

The first comparator ($COMP_1$) 602 is configured to effectively compare the voltage across the bootstrap capacitor ($C_{BOOT}$) 114 against the first threshold voltage ($V_{TH1}$). As noted in method 500, a first condition (Condition A) that can be checked to determine the delay between the turning OFF of the high-side switch ($Q_1$) 202 and the turning OFF of the low-side switch ($Q_2$) 204 is based on the difference between the voltage across the bootstrap capacitor ($C_{BOOT}$) 114 and the first threshold voltage ($V_{TH1}$).

The first comparator ($COMP_1$) 602 is configured with hysteresis-its past states influence its output due to the feedback connection via the adder circuit 604. Adder circuit 604 has a first input configured to receive the first threshold voltage ($V_{TH1}$) and a second input configured to receive the comparator output. The first comparator ($COMP_1$) 602 is configured to receive the summed value of the first threshold voltage ($V_{TH1}$) and the comparator output, which is provided at the output of the adder circuit 604. The first comparator ($COMP_1$) 602 is configured to generate an output signal fed to an input of the first inverter 606. It should be noted that in embodiments, other techniques apart from an adder circuit can be used to implement hysteresis.

In embodiments, the first comparator ($COMP_1$) 602 provides an output signal to the first inverter 606 based on the comparison of the voltage across the bootstrap capacitor ($C_{BOOT}$) 114 and the first threshold voltage ($V_{TH1}$). In response to the summed value of the first threshold voltage ($V_{TH1}$) and the comparator output being greater than the voltage across the bootstrap capacitor ($C_{BOOT}$) 114, the first comparator ($COMP_1$) 602 will output a logic level high (e.g., '1'). In response to the summed value of the first threshold voltage ($V_{TH1}$) and the comparator output being less than the voltage across the bootstrap capacitor ($C_{BOOT}$) 114, the first comparator ($COMP_1$) 602 will output a logic level low (e.g., '0'). The output of the first comparator ($COMP_1$) 602 is inverted through the first inverter 606, and fed to the level-shifter circuit 608.

In response to the voltage across the bootstrap capacitor ($C_{BOOT}$) 114 being greater than or equal to the summed value of the first threshold voltage ($V_{TH1}$) and the comparator output, at step 504, the output of the first inverter 606 is set to a logic level high (e.g., '1'), indicating that the delay needs to be reduced as the voltage ($V_{FGND}$) at the floating ground (FGND) node is below zero. In response to the voltage across the bootstrap capacitor ($C_{BOOT}$) 114 being less than the summed value of the first threshold voltage ($V_{TH1}$) and the comparator output, at step 504, the output of the first inverter 606 is set to a logic level low (e.g., 'o'), indicating that the delay needs to be increased as the voltage ($V_{FGND}$) at the floating ground (FGND) node is above zero.

Level-shifter circuit 608 transfers the digital value at the output of the first inverter 606 from a first part of the closed-loop adjustment circuit 600 referred to as a floating ground to a second part of the closed-loop adjustment circuit 600 with a reference ground. Common methods to implement level-shifter circuit 608 include opto-isolators (i.e., optocouplers), transformers, and cascoded structures. Thus, the level-shifter circuit 608 transfers the digital value at the output of the first inverter 606 to the Reset (R) input of the first flip-flop ($FF_1$) 610.

In embodiments, the first flip-flop ($FF_1$) 610 is a reset-dominant, level-sensitive, set-reset (SR) flip-flop. As the first flip-flop ($FF_1$) 610 is reset-dominant, the Reset (R) input takes precedence over the Set(S) input. This means that if both Set(S) and Reset(S) inputs are at a high level, the first flip-flop ($FF_1$) 610 will go to the "Reset" state, ignoring the Set(S) input. The high-side signal (HVG) is provided at the Set(S) input of the first flip-flop ($FF_1$) 610. Thus, the first flip-flop ($FF_1$) is "Set" when the high-side switch ($Q_1$) 202 is activated.

Further, as the first flip-flop ($FF_1$) 610 is level-sensitive, the first flip-flop ($FF_1$) 610 reacts to the level of the input signals rather than their edge transitions. Thus, as long as the Set (S) input or the Reset (R) input remains at a particular logic level (high or low), the output will maintain its corresponding state. Accordingly, if the output of the first inverter 606 is set to a logic level high (e.g., '1'), indicating that the delay needs to be reduced, the reset signal is asserted at the Reset (R) input of the first flip-flop ($FF_1$) 610. Conversely, if the output of the first inverter 606 is set to a logic level low (e.g., '0'), indicating that the delay needs to be increased, the reset signal is NOT asserted at the Reset (R) input of the first flip-flop ($FF_1$) 610.

The output (Q) of the first flip-flop ($FF_1$) is at a logic level low when the Reset (R) input is at a logic level high (i.e., bootstrap capacitor ($C_{BOOT}$) 114 exceeds the first threshold voltage ($V_{TH1}$)), regardless of whether the high-side switch ($Q_1$) 202 is activated or deactivated. This is because the Reset (R) input is dominant and will override the state of the Set(S) input and force the output (Q) to be low.

The output (Q) of the first flip-flop ($FF_1$) is at a logic level high when (i) the high-side switch ($Q_1$) 202 is activated and (ii) the Reset (R) input is at a logic level low (i.e., bootstrap capacitor ($C_{BOOT}$) 114 is less than the first threshold voltage ($V_{TH1}$)). This is because the Reset (R) input is low, and the Set(S) input influences the output (Q), setting it to a high state.

If the Set(S) and Reset (R) inputs are at a logic level low, corresponding to the high-side switch ($Q_1$) 202 being deactivated and the bootstrap capacitor ($C_{BOOT}$) 114 being less than the first threshold voltage ($V_{TH1}$), the output (Q) will maintain its last value (either high or low).

A first input of the first AND gate 614 is coupled to the output (Q) of the first flip-flop ($FF_1$). The second inverter 612 reverses the logic signal of the high-side signal (HVG) to generate an inverted high-side signal ($HVG_N$), which is at a logic level high when the high-side switch ($Q_1$) 202 is deactivated and at a logic level low when the high-side switch ($Q_1$) 202 is activated.

Thus, the output of the first AND gate 614 provides a positive edge signal to the input of the reverse current timer programming circuit 625 when (i) the high-side switch ($Q_1$) 202 is deactivated and (ii) the output (Q) of the first flip-flop ($FF_1$) is at a logic level high, indicating that the bootstrap capacitor ($C_{BOOT}$) 114 is less than the first threshold voltage ($V_{TH1}$).

The reverse current timer programming circuit 625 includes a first mono-flop ($MF_1$) 616, a second mono-flop ($MF_2$) 618, a first current generator 620, a first capacitor ($C_1$) 622, and a second current generator 624, which may (or may not) be arranged as shown. Alternatively, in embodiments, the reverse current timer programming circuit 625 is implemented digitally as an up-down counter.

The reverse current timer circuit 631 includes a fixed current generator 626, a switch (SW) 628, a second capacitor ($C_2$) 630, an XNOR gate 638, and a second comparator ($COMP_2$) 632. Alternatively, in embodiments, the reverse current timer circuit 631 is implemented digitally as an up counter.

In embodiments, the second comparator ($COMP_2$) 632 is implemented as a digital comparator when the reverse current timer programming circuit 625 and the reverse current timer circuit 631 are implemented digitally.

The End-of-Count (EoC) counter is implemented in the closed-loop adjustment circuit 600 through the reverse current timer programming circuit 625, the reverse current timer circuit 631, and the second AND gate 640. The first mono-flop ($MF_1$) 616 is configured to switch from a stable state to an unstable state for a predetermined period in response to being triggered and then automatically returns to the stable state. In embodiments, the first mono-flop ($MF_1$) 616 is arranged as a positive edge-triggered mono-flop.

In response to the bootstrap capacitor ($C_{BOOT}$) 114 being less than the first threshold voltage ($V_{TH1}$), the positive edge signal (signal transitioning from a logic level low to a logic level high) from the first AND gate 614 triggers the first mono-flop ($MF_1$) 616, resulting in the change of state of the first mono-flop ($MF_1$) 616 and the generating of a charge pulse (CHP) for a duration ($\Delta t_1$) at its output (Q), activating the first current generator 620.

The activating of the first current generator 620 results in the flow of electric charge flowing into the first capacitor ($C_1$) 622. The charge ($\Delta Q$) added to the first capacitor ($C_1$) 622 can be represented by the equation: $\Delta Q = I \times \Delta t_1$, where I is the constant current generated by the first current generator 620. In embodiments, the charge ($\Delta Q$) added to the first capacitor (C)) 622 is 60 to 360 pico-coulombs (pC). In embodiments, the first capacitor ($C_1$) 622 is integrated within the closed-loop adjustment circuit 600. In embodiments, the first capacitor ($C_1$) 622 is ten pico-farads (pF).

When the high-side switch ($Q_1$) 202 is activated, corresponding to the high-side signal (HVG) transitioning from a logic level low to a logic level high, a positive edge signal is provided to the input of the second mono-flop ($MF_2$) 618. The positive edge signal triggers the second mono-flop ($MF_2$) 618, resulting in the change of state of the second mono-flop ($MF_2$) 618 and the generating of a discharge pulse (DISCHP) for a duration ($\Delta t_2$) at its output (Q), which activates the second current generator 624. The second current generator 624 is a negative current generator. The activating of the second current generator 624 results in the discharging of the first capacitor ($C_1$) 622. In embodiments, the first current generator 620 and the second current generator 624 have different, respectively, charging and discharging ramp speeds.

As the charging of the first capacitor ($C_1$) 622 only occurs for cycles when the output of the first AND gate 614 at a logic level high and the discharging of the first capacitor ($C_1$) 622 occurs for each cycle, the closed-loop adjustment circuit 600 determines a balance where a certain number of cycles, the output of the first AND gate 614 is at a logic level high and a certain number of cycles, the output of the first AND gate 614 is at a logic level low.

Accordingly, over multiple cycles, a DC voltage is generated across the first capacitor ($C_1$) 622 with a small ripple. The first capacitor ($C_1$) 622 is sized such that the ripple is negligible compared to the DC voltage. The DC voltage is provided as a reference voltage to the inverting input of the second comparator ($COMP_2$) 632.

The fixed current generator 626 and the second capacitor ($C_2$) 630 provide a ramping voltage to the non-inverting input of the second comparator ($COMP_2$) 632. When the ramping voltage provided to the non-inverting input of the second comparator ($COMP_2$) 632 reaches the DC voltage level, the first input of the second AND gate 640 is at a logic level high. As the inverted high-side signal ($HVG_N$) is at a logic level high (i.e., high-side switch ($Q_1$) 202 is deactivated), the second input of the second AND gate 640 is also at a logic level high. Accordingly, the output of the second AND gate 640 is at a logic level high, which results in a reset signal being asserted at the "Reset" (R) input of the second flip-flop ($FF_2$) 642.

In embodiments, the second flip-flop ($FF_2$) 642 is an edge-sensitive, Set-Reset (S-R) type flip-flop. Thus, the state of the output (Q) of the second flip-flop ($FF_2$) 642 changes based on the Set(S) and Reset (R) inputs, but only at the instance when a triggering edge occurs on a clock signal. The triggering edge could be either the rising edge or the falling edge of the clock signal.

In embodiments, the second flip-flop ($FF_2$) 642 is set by asserting a set signal to the "SET" (S) input of the second flip-flop ($FF_2$) 642 in response to the high-side signal (HVG) being at a logic level high (i.e., high-side switch ($Q_1$) 202 being activated).

When a triggering edge occurs, if the Set(S) input is at a logic level high while the Reset (R) input is at a logic level low, the output (Q) of the second flip-flop ($FF_2$) 642 will transition to a logic level high. Conversely, if at the time of the triggering edge, the Reset (R) input is high and the Set(S) input is low, the output (Q) will transition to a logic level low. This is because the second flip-flop ($FF_2$) 642 "latches" onto the state of the Set(S) and Reset (R) inputs at the moment of the clock edge and updates its output accordingly. In the case where both Set(S) and Reset (R) inputs are low during a triggering edge, the output (Q) will typically remain in its last state. This means that the second flip-flop ($FF_2$) 642 retains its previous output value, either high or low until another triggering edge occurs that results in a change.

Thus, resetting the second flip-flop ($FF_2$) 642, while the high-side switch ($Q_1$) 202 is deactivated (i.e., Set(S) input is set to logic level low) results in the output (Q) of the second flip-flop ($FF_2$) 642 being at a logic level low, which deactivates of the low-side switch ($Q_2$) 204 due to the output (Q) of the second flip-flop ($FF_2$) 642 providing the low-side signal (LAVA) to the gate terminal of the low-side switch ($Q_2$) 204.

The control signal for the switch (SW) 628 is provided by the XNOR gate 638. The first input of the XNOR gate 638 is the high-side signal (HVG) and a second input is the output (Q) of the second flip-flop ($FF_2$) 642. When the high-side signal (HVG) and the low-side signal ($LVG_A$) are at a logic level high (i.e., high-side switch ($Q_1$) 202 and the low-side switch ($Q_2$) 204 are ON) or at a logic level low (i.e., high-side switch ($Q_1$) 202 and the low-side switch ($Q_2$) 204 are OFF), the output of the XNOR gate 638 is at a logic level high, which closes the switch (SW) 628, and resets the closed-loop adjustment circuit 600. Otherwise, the switch (SW) 628 remains open.

Thus, at step 516, after the counter of the closed-loop adjustment circuit 600 reaches the End-of-Count (EoC) counter value, the low-side switch ($Q_2$) 204 is deactivated. Thus, for continuous cycles, in response to the bootstrap capacitor ($C_{BOOT}$) 114 being less than the first threshold voltage ($V_{TH1}$), the End-of-Count (EoC) counter value is increased, and in response to the bootstrap capacitor ($C_{BOOT}$) 114 being greater than the first threshold voltage ($V_{TH1}$), the End-of-Count (EoC) counter value is decreased. Advantageously, this process allows the duration of the delay between the turning OFF of the high-side switch ($Q_1$) 202 and the turning OFF of the low-side switch ($Q_2$) 204 to be dialed in and the bootstrap capacitor ($C_{BOOT}$) 114 to be recharged.

Figure 7:
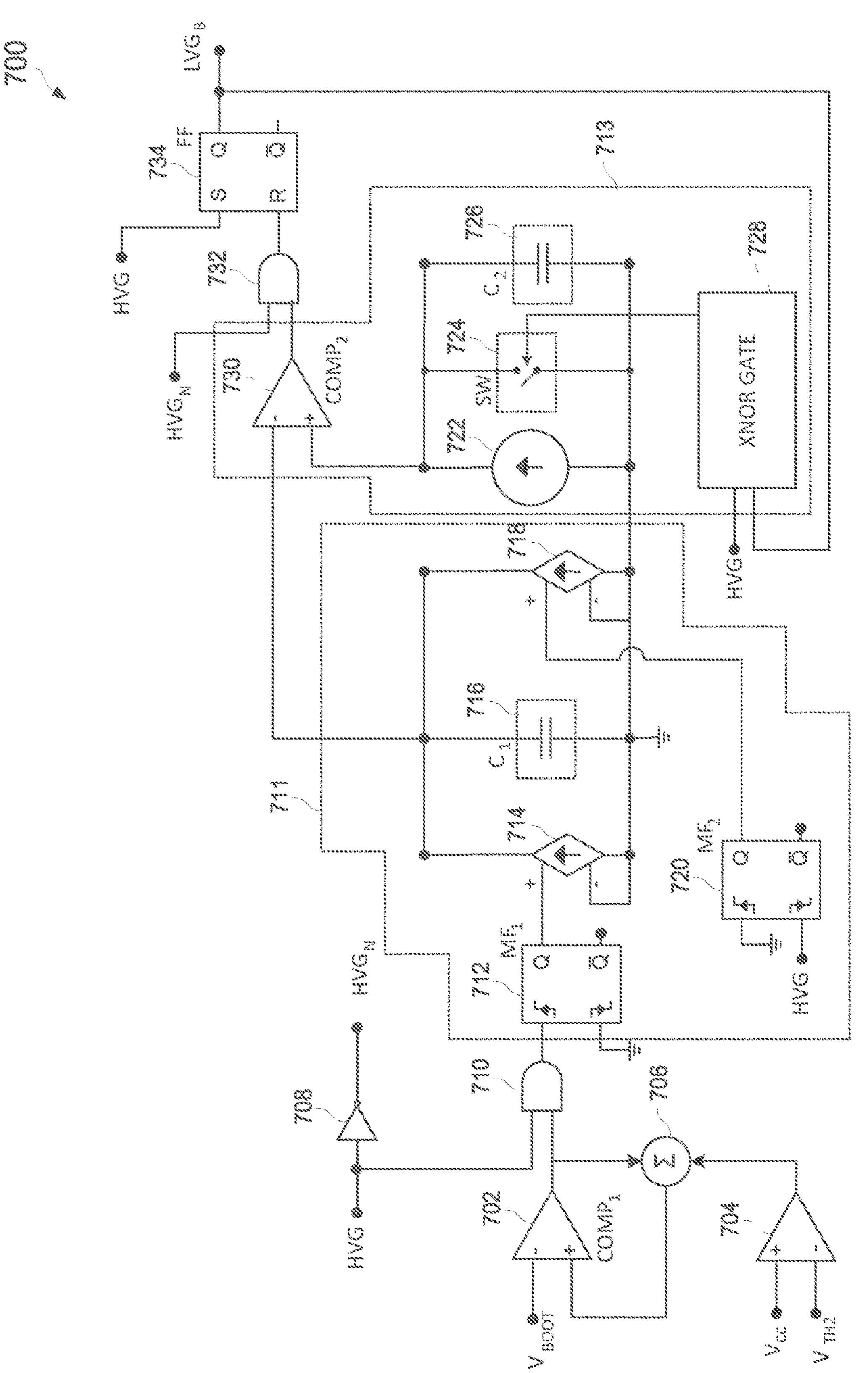
FIG. 7 is a schematic of an embodiment closed-loop adjustment circuit that can be implemented for Condition B of the method of FIG. 5 in the dual-switch flyback converter.

FIG. 7 illustrates a schematic of an embodiment closed-loop adjustment circuit 700 that can be implemented for Condition B of method 500 in the dual-switch flyback converter 200. In embodiments, the closed-loop adjustment circuit 700 is configured to check against condition B immediately after the high-side switch ($Q_1$) 202 is deactivated to determine the delay until the low-side switch ($Q_2$) 204 is deactivated.

Closed-loop adjustment circuit 700 checks for Condition B, and automatically adjusts the delay time between the turning OFF of the high-side switch ($Q_1$) 202 and the turning OFF of the low-side switch ($Q_2$) 204. The delay is increased if the difference between the regulated voltage ($V_{cc}$) and the voltage across the bootstrap capacitor ($C_{BOOT}$) 114 is greater than the second threshold voltage ($V_{TH2}$). This can be represented as: if $(V_{CC}-V_{BST})>V_{TH2} \Rightarrow$ increase delay. And, the delay is decreased if the difference between the regulated voltage ($V_{cc}$) and the voltage across the bootstrap capacitor ($C_{BOOT}$) 114 is less than the second threshold voltage ($V_{TH2}$). This can be represented as: if ($V_{CC}$−$V_{BST}$)<$V_{TH2}$⇒decrease delay.

The output ($LVG_B$) of the closed-loop adjustment circuit 700 is coupled to the gate terminal of the low-side switch ($Q_2$) 204 through, for example, a gate driver (not shown) to effectively turn OFF the low-side switch ($Q_2$) 204 after adjusting the delay through the closed-loop adjustment circuit 700 based on Condition B.

Closed-loop adjustment circuit 700 includes a first comparator ($COMP_1$) 702, an optional differential amplifier 704, an adder circuit 706, a first inverter 708, first AND gate 710, a reverse current timer programming circuit 711, a reverse current timer circuit 712, a second AND gate 732, and a flip-flop (FF) 734, which may (or may not) be arranged as shown. Closed-loop adjustment circuit 700 may include additional components not shown, such as filter circuits. The input of the closed-loop adjustment circuit 700 is coupled to the bootstrap capacitor ($C_{BOOT}$) 114.

In embodiments, the differential amplifier 704 has a unity gain with a non-inverting input coupled to the regulated voltage ($V_{cc}$) and an inverting input coupled to a second threshold voltage ($V_{TH2}$). The first comparator ($COMP_1$) 702 is configured to effectively compare the difference between the regulated voltage ($V_{cc}$) and the voltage across the bootstrap capacitor ($C_{BOOT}$) 114, at the output of the differential amplifier 704 against the second threshold voltage ($V_{TH2}$). As noted in method 500, a second condition (Condition B) that can be checked to determine the delay between the turning OFF of the high-side switch ($Q_1$) 202 and the turning OFF of the low-side switch ($Q_2$) 204 is based on the difference between the regulated voltage ($V_{cc}$) and the voltage across the bootstrap capacitor ($C_{BOOT}$) 114 being less than the second threshold voltage ($V_{TH2}$). In embodiments, the regulated voltage ($V_{cc}$) and the second threshold voltage ($V_{TH2}$) are provided to the adder circuit 706. In such an embodiment, the regulated voltage ($V_{cc}$) is provided to a non-inverting input of the adder circuit 706 and the second threshold voltage ($V_{TH2}$) is provided to an inverting input of the adder circuit 706.

The first comparator ($COMP_1$) 702 is configured with hysteresis-its past states influence its output due to the feedback connection via the adder circuit 706. Adder circuit 706 has a first input configured to receive the difference between the regulated voltage ($V_{cc}$) and the second threshold voltage ($V_{TH2}$). A second input of the adder circuit 706 is configured to receive the comparator output. The first comparator ($COMP_1$) 702 is configured to generate an output signal fed to a first input of the first AND gate 710.

In embodiments, the first comparator ($COMP_1$) 702 provides an output signal to the first AND gate 710 based on the comparison of (i) the voltage across the bootstrap capacitor ($C_{BOOT}$) 114 and (ii) the difference between the regulated voltage ($V_{cc}$) and the second threshold voltage ($V_{TH2}$). In response to the difference between the regulated voltage ($V_{cc}$) and the second threshold voltage ($V_{TH2}$) being greater than the voltage across the bootstrap capacitor ($C_{BOOT}$) 114, the first comparator ($COMP_1$) 702 will output a logic level high (e.g., '1'). In response to the difference between the regulated voltage ($V_{cc}$) and the second threshold voltage ($V_{TH2}$) being less than the voltage across the bootstrap capacitor ($C_{BOOT}$) 114, the first comparator ($COMP_1$) 702 will output a logic level low (e.g., '0').

In response to the difference between the regulated voltage ($V_{cc}$) and the second threshold voltage ($V_{TH2}$) being less than the voltage across the bootstrap capacitor ($C_{BOOT}$) 114, at step 504, the output of the first comparator ($COMP_1$) 702 is set to a logic level low (e.g., '0'), indicating that the delay needs to be reduced as the voltage ($V_{FGND}$) at the floating ground (FGND) node is below zero. In response to the difference between the regulated voltage ($V_{cc}$) and the second threshold voltage ($V_{TH2}$) being greater than the voltage across the bootstrap capacitor ($C_{BOOT}$) 114, at step 504, the output of the first comparator ($COMP_1$) 702 is set to a logic level high (e.g., '1'), indicating that the delay needs to be increased as voltage ($V_{FGND}$) at the floating ground (FGND) node is above zero.

The second input of the first AND gate 710 is coupled to the high-side signal (HVG). Thus, the output of the first AND gate 710 provides a positive edge signal to the input of the reverse current timer programming circuit 711 when (i) the high-side switch ($Q_1$) 202 is activated and (ii) the output of the first comparator ($COMP_1$) 702 is set to a logic level high (e.g., '1'), indicating that the difference between the regulated voltage ($V_{cc}$) and the second threshold voltage ($V_{TH2}$) is greater than the voltage across the bootstrap capacitor ($C_{BOOT}$) 114.

The reverse current timer programming circuit 711 includes a first mono-flop ($MF_1$) 712, a second mono-flop ($MF_2$) 720, a first current generator 714, a first capacitor ($C_1$) 716, and a second current generator 718, which may (or may not) be arranged as shown. Alternatively, in embodiments, the reverse current timer programming circuit 711 is implemented digitally as an up-down counter.

The reverse current timer circuit 713 includes a fixed current generator 722, a switch (SW) 724, a second capacitor ($C_2$) 726, an XNOR gate 728, and a second comparator ($COMP_2$) 730. Alternatively, in embodiments, the reverse current timer circuit 713 is implemented digitally as an up counter.

In embodiments, the second comparator ($COMP_2$) 730 is implemented as a digital comparator when the reverse current timer programming circuit 625 and the reverse current timer circuit 631 are implemented digitally.

The End-of-Count (EoC) counter is implemented in the closed-loop adjustment circuit 700 through the reverse current timer programming circuit 711, the reverse current timer circuit 713, and the second AND gate 732. The first mono-flop ($MF_1$) 712 is configured to switch from a stable state to an unstable state for a predetermined period in response to being triggered and then automatically returns to the stable state. In embodiments, the first mono-flop ($MF_1$) 712 is arranged as a positive edge-triggered mono-flop.

In response to (i) the high-side switch ($Q_1$) 202 being activated and (ii) the output of the first comparator ($COMP_1$) 702 being set to a logic level high (e.g., '1'), indicating that the difference between the regulated voltage ($V_{cc}$) and the second threshold voltage ($V_{TH2}$) is greater than the voltage across the bootstrap capacitor ($C_{BOOT}$) 114, the positive edge signal (signal transitioning from a logic level low to a logic level high) from the first AND gate 710 triggers the first mono-flop ($MF_1$) 712, resulting in the change of state of the first mono-flop ($MF_1$) 712 and the generating of a charge pulse (CHP) for a duration ($\Delta t_1$) at its output (Q), activating the first current generator 714.

The activating of the first current generator 714 results in the flow of electric charge flowing into the first capacitor ($C_1$) 716. The charge ($\Delta Q$) added to the first capacitor ($C_1$) 716 can be represented by the equation: $\Delta Q=1\times\Delta t_1$, where I is the constant current generated by the first current generator 714. In embodiments, the charge ($\Delta Q$) added to the first capacitor ($C_1$) 716 is between 60 and 360 pico-coulombs (pC). In embodiments, the first capacitor ($C_1$) 716 is integrated within the closed-loop adjustment circuit 700. In embodiments, the first capacitor ($C_1$) 716 is ten pico-farads (pF).

In embodiments, the second mono-flop ($MF_1$) 720 is arranged as a negative edge-triggered mono-flop. When the high-side switch ($Q_1$) 202 is deactivated, corresponding to the high-side signal (HVG) transitioning from a logic level high to a logic level low, a negative edge signal is provided to the input of the second mono-flop ($MF_2$) 720. The negative edge signal triggers the second mono-flop ($MF_2$) 720, resulting in the change of state of the second mono-flop ($MF_2$) 720 and the generating of a discharge pulse (DISCHP) for a duration ($\Delta t_2$) at its output (Q), which activates the second current generator 718. The second current generator 718 is a negative current generator. The activating of the second current generator 718 results in the discharging of the first capacitor ($C_1$) 716. In embodiments, the first current generator 714 and the second current generator 720 have different, respectively, charging and discharging ramp speeds.

As the charging of the first capacitor ($C_1$) 716 only occurs for cycles when the output of the first AND gate 710 at a logic level high and the discharging of the first capacitor ($C_1$) 716 occurs for each cycle, the closed-loop adjustment circuit 700 determines a balance where a certain number of cycles, the output of the first AND gate 710 is at a logic level high and a certain number of cycles, the output of the first AND gate 710 is at a logic level low.

Accordingly, over multiple cycles, a DC voltage is generated across the first capacitor ($C_1$) 716 with a small ripple. The first capacitor ($C_1$) 716 is sized such that the ripple is negligible compared to the DC voltage. The DC voltage is provided as a reference voltage to the inverting input of the second comparator ($COMP_2$) 730.

The fixed current generator 722 and the second capacitor ($C_2$) 726 provide a ramping voltage to the non-inverting input of the second comparator ($COMP_2$) 730. When the ramping voltage provided to the non-inverting input of the second comparator ($COMP_2$) 730 reaches the DC voltage level, the first input of the second AND gate 732 is at a logic level high.

The first inverter 708 reverses the logic signal of the high-side signal (HVG) to generate an inverted high-side signal ($HVG_N$), which is at a logic level high when the high-side switch ($Q_1$) 202 is deactivated and at a logic level low when the high-side switch ($Q_1$) 202 is activated. As the inverted high-side signal ($HVG_N$) is at a logic level high (i.e., high-side switch ($Q_1$) 202 is deactivated), the second input of the second AND gate 732 is also at a logic level high. Accordingly, the output of the second AND gate 732 is at a logic level high, which results in a reset signal being asserted at the "Reset" (R) input of the flip-flop (FF) 734.

In embodiments, the flip-flop (FF) 734 is an edge-sensitive, Set-Reset (S-R) type flip-flop. Thus, the state of the output (Q) of the flip-flop (FF) 734 changes based on the Set(S) and Reset (R) inputs, but only at the instance when a triggering edge occurs on a clock signal. The triggering edge could be either the rising edge or the falling edge of the clock signal.

In embodiments, the flip-flop (FF) 734 is set by asserting a set signal to the "SET" (S) input of the flip-flop (FF) 734 in response to the high-side signal (HVG) being at a logic level high (i.e., high-side switch ($Q_1$) 202 being activated).

When a triggering edge occurs, if the Set(S) input is at a logic level high while the Reset (R) input is at a logic level low, the output (Q) of the flip-flop (FF) 734 will transition to a logic level high. Conversely, if at the time of the triggering edge, the Reset (R) input is high and the Set(S) input is low, the output (Q) will transition to a logic level low. This is because the flip-flop (FF) 734 "latches" onto the state of the Set(S) and Reset (R) inputs at the moment of the clock edge and updates its output accordingly. In the case where both Set(S) and Reset (R) inputs are low during a triggering edge, the output (Q) will typically remain in its last state. This means that the flip-flop (FF) 734 retains its previous output value, either high or low until another triggering edge occurs that results in a change.

Thus, resetting the flip-flop (FF) 734, while the high-side switch ($Q_1$) 202 is deactivated (i.e., Set(S) input is set to logic level low) results in the output (Q) of the flip-flop (FF) 734 being at a logic level low, which deactivates of the low-side switch ($Q_2$) 204 due to the output (Q) of the flip-flop (FF) 734 providing the low-side signal ($LVG_B$) to the gate terminal of the low-side switch ($Q_2$) 204.

The control signal for the switch (SW) 724 is provided by the XNOR gate 728. The first input of the XNOR gate 728 is the high-side signal (HVG) and the second input is the output (Q) of the flip-flop (FF) 734. When the high-side signal (HVG) and the low-side signal ($LVG_B$) are at a logic level high (i.e., high-side switch ($Q_1$) 202 and the low-side switch ($Q_2$) 204 are ON) or at a logic level low (i.e., high-side switch ($Q_1$) 202 and the low-side switch ($Q_2$) 204 are OFF), the output of the XNOR gate 728 is at a logic level high, which closes the switch (SW) 724, and resets the closed-loop adjustment circuit 700. Otherwise, the switch (SW) 724 remains open.

Thus, at step 516, after the counter of the closed-loop adjustment circuit 700 reaches the End-of-Count (EoC) counter value, the low-side switch ($Q_2$) 204 is deactivated. Thus, for continuous cycles, in response to the difference between the regulated voltage ($V_{cc}$) and the second threshold voltage ($V_{TH2}$) being less than the voltage across the bootstrap capacitor ($C_{BOOT}$) 114, the End-of-Count (EoC) counter value is increased, and in response to the difference between the regulated voltage ($V_{cc}$) and the second threshold voltage ($V_{TH2}$) being greater than the voltage across the bootstrap capacitor ($C_{BOOT}$) 114, the End-of-Count (EoC) counter value is decreased. Advantageously, this process allows the duration of the delay between the turning OFF of the high-side switch ($Q_1$) 202 and the turning OFF of the low-side switch ($Q_2$) 204 to be dialed in and the bootstrap capacitor ($C_{BOOT}$) 114 to be recharged.

Figure 8:
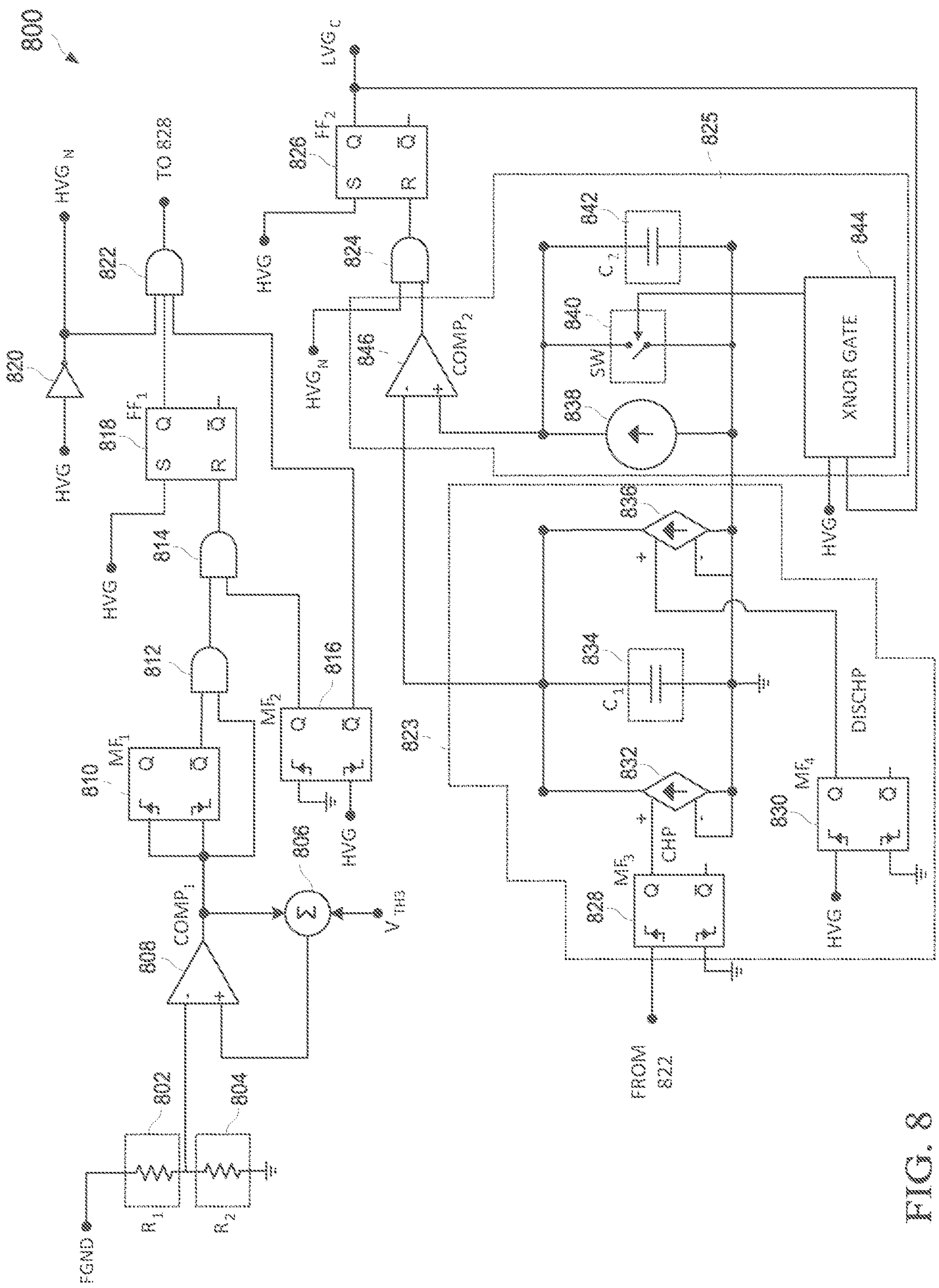
FIG. 8 is a schematic of an embodiment closed-loop adjustment circuit that can be implemented for Condition C of the method of FIG. 5 in the dual-switch flyback converter.

FIG. 8 illustrates a schematic of an embodiment closed-loop adjustment circuit 800 that can be implemented for Condition C of method 500 in the dual-switch flyback converter 200.

Closed-loop adjustment circuit 800 checks for Condition C, and automatically adjusts the delay time between the turning OFF of the high-side switch ($Q_1$) 202 and the turning OFF of the low-side switch ($Q_2$) 204. The delay is increased if the voltage ($V_{FGND}$) at the floating ground (FGND) node is greater than the third threshold voltage ($V_{TH3}$) for $\tau_1$ seconds within the $\tau_2$ second period immediately after the high-side switch ($Q_1$) 202 is turned OFF. This can be represented as: if $V_{FGND}>V_{TH3}\Rightarrow$increase delay, where $V_{FGND}$ is the voltage at the floating ground (FGND) for $\tau_1$ seconds within the $\tau_2$ second period. The delay is decreased if the voltage ($V_{FGND}$) at the floating ground (FGND) node is less than the third threshold voltage ($V_{TH3}$) for $\tau_1$ seconds within a $\tau_2$ second period immediately after the high-side switch ($Q_1$) 202 is turned OFF. This can be represented as: if $V_{FGND}(t)<V_{TH3}\Rightarrow$decrease delay.

The output of the closed-loop adjustment circuit 800 is coupled to the gate terminal of the low-side switch ($Q_2$) 204 through, for example, a gate driver (not shown) to effectively turn OFF the low-side switch ($Q_2$) 204 after adjusting the delay through the closed-loop adjustment circuit 800 based on Condition C.

Closed-loop adjustment circuit 800 includes a first resistor ($R_1$) 802, a second resistor ($R_2$) 804, an adder circuit 806, a first comparator ($COMP_1$) 808, a first mono-flop ($MF_1$) 810, a first AND gate 812, a second AND gate 814, a second mono-flop ($MF_2$) 816, a first flip-flop ($FF_1$) 818, a first inverter 820, a third AND gate 822, a reverse current timer programming circuit 823, a reverse current timer circuit 825, a fourth AND gate 824, and a second flip-flop ($FF_2$) 826, which may (or may not) be arranged as shown. Closed-loop adjustment circuit 800 may include additional components not shown, such as filter circuits. The input of the closed-loop adjustment circuit 800 is coupled to the source terminal of the high-side transistor (Q) 104.

The first comparator ($COMP_1$) 808 is configured to effectively compare voltage ($V_{FGND}$) at the floating ground (FGND) node through the voltage divider (i.e., voltage divider comprising the first resistor ($R_1$) 802 and the second resistor ($R_2$) 804) against the third threshold voltage ($V_{TH3}$). As noted in method 500, a third condition (Condition C) that can be checked to determine the delay between the turning OFF of the high-side switch ($Q_1$) 202 and the turning OFF of the low-side switch ($Q_2$) 204 is based on the voltage ($V_{FGND}$) at the floating ground (FGND) node being less than a third threshold voltage ($V_{TH3}$) for $\tau_1$ seconds within a $\tau_2$ second period immediately after the high-side switch ($Q_1$) 202 is turned OFF.

The first comparator ($COMP_1$) 808 is configured with hysteresis—provided from the output of the first AND gate 812. The first comparator ($COMP_1$) 808 has an inverting input (-) configured to receive the voltage ($V_{FGND}$) at the floating ground (FGND) node. The non-inverting input of the first comparator ($COMP_1$) 808 is coupled to the output of the adder circuit 806.

The adder circuit 806 has a first input configured to receive the third threshold voltage ($V_{TH3}$). A second input of the adder circuit 806 is configured to receive the output of the first AND gate 812. The first comparator ($COMP_1$) 808 is configured to generate an output signal fed to the first mono-flop ($MF_1$) 810 and a first input of the first AND gate 812. The second input of the first AND gate 812 is coupled to the Not-Q ($\overline{Q}$) output of the first mono-flop ($MF_1$) 810.

The first mono-flop ($MF_1$) 810 is configured to switch from a stable state to an unstable state for $\tau_1$ seconds in response to being triggered and then automatically returns to the stable state. In embodiments, the first mono-flop ($MF_1$) 810 is arranged as an edge-triggered (positive or negative) mono-flop.

In response to the output of the first comparator ($COMP_1$) 808 transitioning from a logic level high to a logic level low or from a logic level low to a logic level high, the first mono-flop ($MF_1$) 810 is triggered, resulting in the change of state and the generating of a set signal to the second input of the first AND gate 812 for a duration of $\tau_1$ seconds through the Not-Q ($\overline{Q}$) output of the first mono-flop ($MF_1$) 810.

In response to the output of the first comparator ($COMP_1$) 808 and the Not-Q ($\overline{Q}$) output of the first mono-flop ($MF_1$) 810 being at a logic level high, the first AND gate 812 provides a logic level high signal to a first input of the second AND gate 814. A second input of the second AND gate 814 is provided by the output (Q) of the second mono-flop ($MF_2$) 816.

The second mono-flop ($MF_2$) 816 is configured to switch from a stable state to an unstable state for $\tau_2$ seconds in response to being triggered and then automatically returns to the stable state. In embodiments, the second mono-flop ($MF_2$) 816 is arranged as a negative edge-triggered mono-flop. In particular, the second mono-flop ($MF_2$) 816 is triggered in response to the high-side signal (HVG) transitioning from a logic level high to a logic level low (i.e., high-side switch ($Q_1$) 202 being deactivated), which is provided as a logic high signal to the input of the second AND gate 814.

In response to the high-side signal (HVG) transitioning from a logic level high to a logic level low and the output of the first AND gate 812 being at a logic level high, the second AND gate 814 provides a reset signal to the Reset (R) input of the first flip-flop ($FF_1$) 818. In embodiments, the first flip-flop ($FF_1$) 818 is an edge-sensitive flip-flop. The Set(S) input of the first flip-flop ($FF_1$) 818 is set when the high-side signal (HVG) is at a logic level high.

Thus, when the high-side switch ($Q_1$) 202 is deactivated and the first AND gate 812 is at a logic level high, the second AND gate resets the first flip-flop ($FF_1$) 818 and provides a logic level high to the first input of the third AND gate 822. A second input of the third AND gate 822 is coupled to the output of the first inverter 820. The first inverter 820 inverts the high-side signal (HVG) to generate an inverted high-side signal ($HVG_N$). Thus, when the high-side switch ($Q_1$) 202 is deactivated, the inverted high-side signal ($HVG_N$) is at a logic level high. The third input of the third AND gate 822 is coupled to the Not-Q (Q) output of the second mono-flop ($MF_2$) 816.

The reverse current timer programming circuit 823 includes a third mono-flop ($MF_3$) 828, a fourth mono-flop ($MF_4$) 830, a first current generator 832, a first capacitor ($C_1$) 834, and a second current generator 836, which may (or may not) be arranged as shown. Alternatively, in embodiments, the reverse current timer programming circuit 823 is implemented digitally as an up-down counter.

The reverse current timer circuit 825 includes a fixed current generator 838, a switch (SW) 840, a second capacitor ($C_2$) 842, an XNOR gate 844, and a second comparator ($COMP_2$) 846. Alternatively, in embodiments, the reverse current timer circuit 825 is implemented digitally as an up counter.

In embodiments, the second comparator ($COMP_2$) 846 is implemented as a digital comparator when the reverse current timer programming circuit 823 and the reverse current timer circuit 825 are implemented digitally.

The End-of-Count (EoC) counter is implemented in the closed-loop adjustment circuit 800 through the reverse current timer programming circuit 823, the reverse current timer circuit 825, and the fourth AND gate 824. The third mono-flop ($MF_3$) 828 is configured to switch from a stable state to an unstable state for a predetermined period in response to being triggered and then automatically returns to the stable state. In embodiments, the third mono-flop ($MF_3$) 828 is arranged as a positive edge-triggered mono-flop.

In response to the three inputs to the third AND gate 822 transitioning to a logic level high, a positive edge trigger is provided to the third mono-flop ($MF_3$) of the reverse current timer programming circuit 823. The positive edge signal (signal transitioning from a logic level low to a logic level high) from the third AND gate 822 triggers the third mono-flop ($MF_3$) 828, resulting in the change of state and the generating of a charge pulse (CHP) for a duration ($\Delta t_3$) at its output (Q), activating the first current generator 832.

The activating of the first current generator 832 results in the flow of electric charge flowing into the first capacitor ($C_1$) 834. The charge ($\Delta Q$) added to the first capacitor ($C_1$)

834 can be represented by the equation: $\Delta Q = 1 \times \Delta t_2$, where I is the constant current generated by the first current generator 832. In embodiments, the charge ($\Delta Q$) added to the first capacitor ($C_1$) 834 is between 60 and 360 pico-coulombs (pC). In embodiments, the first capacitor ($C_1$) 834 is integrated within the closed-loop adjustment circuit 800. In embodiments, the first capacitor ($C_1$) 834 is ten pico-farads (pF).

In embodiments, the fourth mono-flop ($MF_4$) 830 is arranged as a positive edge-triggered mono-flop. When the high-side switch ($Q_1$) 202 is activated, corresponding to the high-side signal (HVG) transitioning from a logic level low to a logic level high, a positive edge signal is provided to the input of the fourth mono-flop ($MF_4$) 830. The positive edge signal triggers the fourth mono-flop ($MF_4$) 830, resulting in the change of state and the generating of a discharge pulse (DISCHP) for a duration ($\Delta t_4$) at its output (Q), which activates the second current generator 836. The second current generator 836 is a negative current generator. The activating of the second current generator 836 results in the discharging of the first capacitor ($C_1$) 834. In embodiments, the first current generator 832 and the second current generator 836 have different, respectively, charging and discharging ramp speeds.

As the charging of the first capacitor ($C_1$) 834 only occurs for cycles when the output of the third AND gate 822 at a logic level high and the discharging of the first capacitor ($C_1$) 834 occurs for each cycle, the closed-loop adjustment circuit 800 determines a balance where a certain number of cycles, the output of the third AND gate 822 is at a logic level high and a certain number of cycles, the output of the third AND gate 822 is at a logic level low.

Accordingly, over multiple cycles, a DC voltage is generated across the first capacitor ($C_1$) 834 with a small ripple. The first capacitor ($C_1$) 834 is sized such that the ripple is negligible compared to the DC voltage. The DC voltage is a reference voltage to the inverting input of the second comparator ($COMP_2$) 846.

The fixed current generator 838 and the second capacitor ($C_2$) 842 provide a ramping voltage to the non-inverting input of the second comparator ($COMP_2$) 846. When the ramping voltage provided to the non-inverting input of the second comparator ($COMP_2$) 846 reaches the DC voltage level, the first input of the fourth AND gate 824 is at a logic level high.

As the inverted high-side signal ($HVG_N$) is at a logic level high (i.e., high-side switch (Q) 202 is deactivated), the second input of the fourth AND gate 824 is also at a logic level high. Accordingly, the output of the fourth AND gate 824 is at a logic level high, which results in a reset signal being asserted at the "Reset" (R) input of the second flip-flop ($FF_2$) 826.

In embodiments, the second flip-flop ($FF_2$) 826 is an edge-sensitive, Set-Reset (S-R) type flip-flop. Thus, the state of the output (Q) of the second flip-flop ($FF_2$) 826 changes based on the Set(S) and Reset (R) inputs, but only at the instance when a triggering edge occurs on a clock signal. The triggering edge could be either the rising edge or the falling edge of the clock signal.

In embodiments, the second flip-flop ($FF_2$) 826 is set by asserting a set signal to the "SET" (S) input of the second flip-flop ($FF_2$) 826 in response to the high-side signal (HVG) being at a logic level high (i.e., high-side switch ($Q_1$) 202 being activated).

When a triggering edge occurs, if the Set(S) input is at a logic level high while the Reset (R) input is at a logic level low, the output (Q) of the second flip-flop ($FF_2$) 826 will transition to a logic level high. Conversely, if at the time of the triggering edge, the Reset (R) input is high and the Set(S) input is low, the output (Q) will transition to a logic level low. This is because the second flip-flop ($FF_2$) 826 "latches" onto the state of the Set(S) and Reset (R) inputs at the moment of the clock edge and updates its output accordingly. In the case where both Set(S) and Reset (R) inputs are low during a triggering edge, the output (Q) will typically remain in its last state. This means that the second flip-flop ($FF_2$) 826 retains its previous output value, either high or low until another triggering edge occurs that results in a change.

Thus, resetting the second flip-flop ($FF_2$) 826, while the high-side switch ($Q_1$) 202 is deactivated (i.e., Set(S) input is set to logic level low) results in the output (Q) of the second flip-flop ($FF_2$) 826 being at a logic level low, which deactivates of the low-side switch ($Q_2$) 204 due to the output (Q) of the second flip-flop ($FF_2$) 826 providing the low-side signal ($LVG_C$) to the gate terminal of the low-side switch ($Q_2$) 204.

The control signal for the switch (SW) 840 is provided by the XNOR gate 844. The first input of the XNOR gate 844 is the high-side signal (HVG) and a second input is the output (Q) of the second flip-flop ($FF_2$) 826. When the high-side signal (HVG) and the low-side signal (LVG) are at a logic level high (i.e., high-side switch ($Q_1$) 202 and the low-side switch ($Q_2$) 204 are ON) or at a logic level low (i.e., high-side switch ($Q_1$) 202 and the low-side switch ($Q_2$) 204 are OFF), the output of the XNOR gate 844 is at a logic level high, which closes the switch (SW) 840, and resets the closed-loop adjustment circuit 800. Otherwise, the switch (SW) 840 remains open.

Thus, at step 516, after the counter of the closed-loop adjustment circuit 800 reaches the End-of-Count (EoC) counter value, the low-side switch ($Q_2$) 204 is deactivated. Thus, for continuous cycles, in response to the voltage ($V_{FGND}$) at the floating ground (FGND) node being higher than the third threshold voltage ($V_{TH3}$) for $\tau_1$ seconds within a $\tau_2$ second period immediately after the high-side switch ($Q_1$) 202 is turned OFF, the End-of-Count (EoC) counter value is increased. And, in response to the voltage ($V_{FGND}$) at the floating ground (FGND) node being less than the third threshold voltage ($V_{TH3}$) for $\tau_1$ seconds within a $\tau_2$ second period immediately after the high-side switch ($Q_1$) 202 is turned OFF, the End-of-Count (EoC) counter value is decreased. Advantageously, this process allows the duration of the delay between the turning OFF of the high-side switch ($Q_1$) 202 and the turning OFF of the low-side switch ($Q_2$) 204 to be dialed in and the bootstrap capacitor ($C_{BOOT}$) 114 to be recharged.

Figures 9, 10:
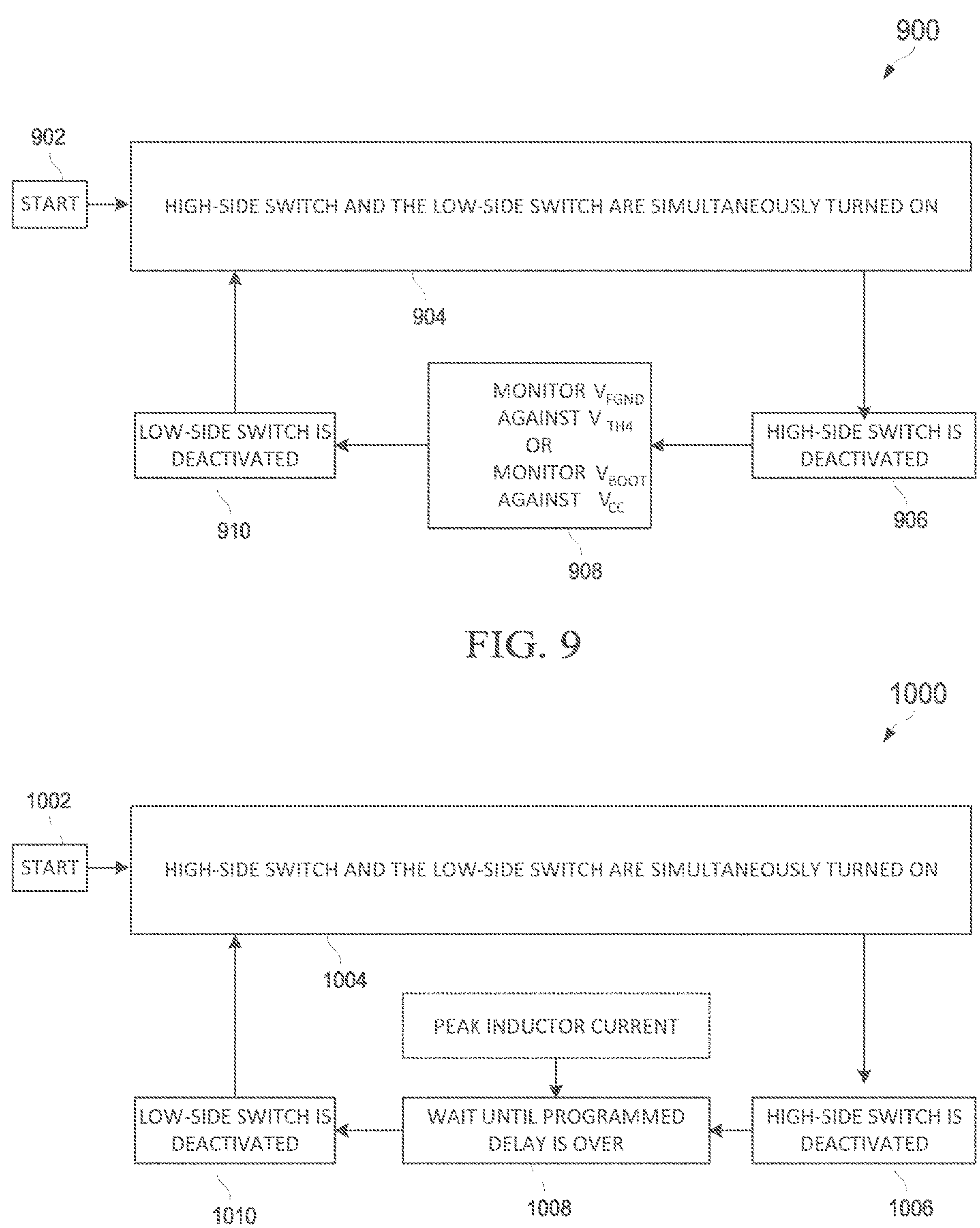
FIG. 9 is a flow chart of an embodiment method for operating the dual-switch flyback converter based on Direct Delay Setting (DDS)
FIG. 10 is a flow chart of an embodiment method for operating the dual-switch flyback converter using an open-loop control algorithm.

FIG. 9 illustrates a flow chart of an embodiment method 900 for operating the dual-switch flyback converter 200 based on Direct Delay Setting (DDS). It is noted that all steps outlined in the flow chart are not necessarily required and can be optional. Further, changes to the arrangement of the steps, removal of one or more steps and path connections, and addition of steps and path connections are similarly contemplated.

In embodiments, to ensure the voltage ($V_{FGND}$) at the floating ground (FGND) node goes to zero, the low-side switch ($Q_2$) 204 is deactivated after the high-side switch ($Q_1$) 202 is deactivated with a delay. In embodiments, based on DDS, a delay is introduced only after the voltage ($V_{FGND}$) at the floating ground (FGND) node falls below a fourth threshold voltage ($V_{TH4}$). The delay in turning OFF the low-side switch ($Q_2$) 204 after the turning OFF of the high-side switch ($Q_1$) 202 is set to sufficiently allow the voltage ($V_{FGND}$) at the floating ground (FGND) node to fall below the fourth threshold voltage ($V_{TH4}$) to allow the bootstrap capacitor ($C_{BOOT}$) 114 to be recharged.

To achieve DDS, either the voltage ($V_{FGND}$) at the floating ground (FGND) node is monitored until it is at zero or the voltage ($V_{BOOT}$) at the bootstrap capacitor ($C_{BOOT}$) 114 is monitored until it falls below the regulated voltage ($V_{cc}$). Once one or both conditions are detected, a delay is introduced before the low-side switch ($Q_2$) 204 is turned OFF to allow the bootstrap capacitor ($C_{BOOT}$) 114 to be recharged.

At step 902, the DDS operation begins. At step 904, the high-side switch ($Q_1$) 202 and the low-side switch ($Q_2$) 204 are simultaneously turned ON. At step 906, the high-side switch ($Q_1$) 202 is deactivated. In embodiments, the high-side switch ($Q_1$) 202 is deactivated when the peak inductor current reaches a value programmed by a control loop. In embodiments, the control loop regulates the output voltage ($V_{OUT}$) by adjusting the duty cycle of the high-side switch ($Q_1$) 202 and the low-side switch ($Q_2$) 204. In embodiments, a current sensor measures the inductor current in real time, fed to the control loop. Once the inductor current reaches the predetermined peak value, as set by the control loop, the high-side switch ($Q_1$) 202 is turned off. This action terminates the energy storage phase in the windings of the primary side ($L_P$) and initiates the energy transfer to the windings of the secondary side ($L_S$).

At step 908, the voltage ($V_{FGND}$) at the floating ground (FGND) node is monitored against a fourth threshold voltage ($V_{TH4}$). Alternatively, the voltage ($V_{BOOT}$) at the bootstrap capacitor ($C_{BOOT}$) 114 is monitored until it falls below the regulated voltage ($V_{cc}$).

At step 910, in response to the voltage ($V_{FGND}$) at the floating ground (FGND) node falling below the fourth threshold voltage ($V_{TH4}$) OR the voltage ($V_{BOOT}$) at the bootstrap capacitor ($C_{BOOT}$) 114 falling below the regulated voltage ($V_{cc}$), after the predetermined delay, the low-side switch ($Q_2$) 204 is deactivated. In embodiments, the predetermined delay is provided by an internal delay (e.g., 100 ns) from, for example, a delay introduced by a comparator to check for the conditions, the delay to turn OFF the switch, or a combination thereof. Steps 904 through 910 are repeated for subsequent cycles of the dual-switch flyback converter 200.

FIG. 10 illustrates a flow chart of an embodiment method 1000 for operating the dual-switch flyback converter 200 using an open-loop control algorithm. It is noted that all steps outlined in the flow chart are not necessarily required and can be optional. Further, changes to the arrangement of the steps, removal of one or more steps and path connections, and addition of steps and path connections are similarly contemplated.

Generally, the leakage inductance energy depends on the peak inductor current. A larger peak inductor current (e.g., heavy load) results in a higher leakage inductance energy, which would require a shorter delay. Conversely, a smaller peak inductor current (e.g., light load) results in a lower leakage inductance energy, which would require a longer delay.

In embodiments, the load condition (e.g., heavy or light load) can be monitored using the peak current mode control, as the control voltage ($V_C$) of the feedback loop for regulating the output voltage is linked (i.e., proportionally related) to the peak inductor current. Accordingly, in embodiments, the delay corresponds to a decreasing monotonic function of the control voltage ($V_C$) of the feedback loop for regulating the output voltage. Thus, for heavy loads, the control voltage ($V_C$) is higher, and for light loads, the control voltage ($V_C$) is smaller.

At step 1002, the open-loop adjustment operation begins. At step 1004, the high-side switch ($Q_1$) 202 and the low-side switch ($Q_2$) 204 are simultaneously turned ON. At step 1006, the high-side switch ($Q_1$) 202 is deactivated. In embodiments, the high-side switch ($Q_1$) 202 is deactivated when the peak inductor current reaches a value programmed by a control loop. In embodiments, the control loop regulates the output voltage ($V_{OUT}$) by adjusting the duty cycle of the high-side switch ($Q_1$) 202 and the low-side switch ($Q_2$) 204. In embodiments, a current sensor measures the inductor current in real time, fed to the control loop. Once the inductor current reaches the predetermined peak value, as set by the control loop, the high-side switch ($Q_1$) 202 is turned off. This action terminates the energy storage phase in the windings of the primary side ($L_P$) and initiates the energy transfer to the windings of the secondary side ($L_S$).

At step 1008, a counter is used based on a programmable delay. In embodiments, the delay between the turning OFF of the low-side switch ($Q_2$) 204 after the turning OFF of the high-side switch ($Q_1$) 202 is a duration that is a function of the control voltage ($V_C$) of the feedback loop for regulating the output voltage ($V_{OUT}$). Thus, for heavy loads, the control voltage ($V_C$) is higher, and the delay is shorter while for light loads, the control voltage ($V_C$) is smaller and the delay is longer. In embodiments, an external pin is provided for the dual-switch flyback converter 200 to allow users to modify the programmable delay.

At step 1010, in response to the passage of the fixed or programmable delay, the low-side switch ($Q_2$) 204 is deactivated. Steps 1004 through 1010 are repeated for subsequent cycles of the dual-switch flyback converter 200.

Figures 11, 12:
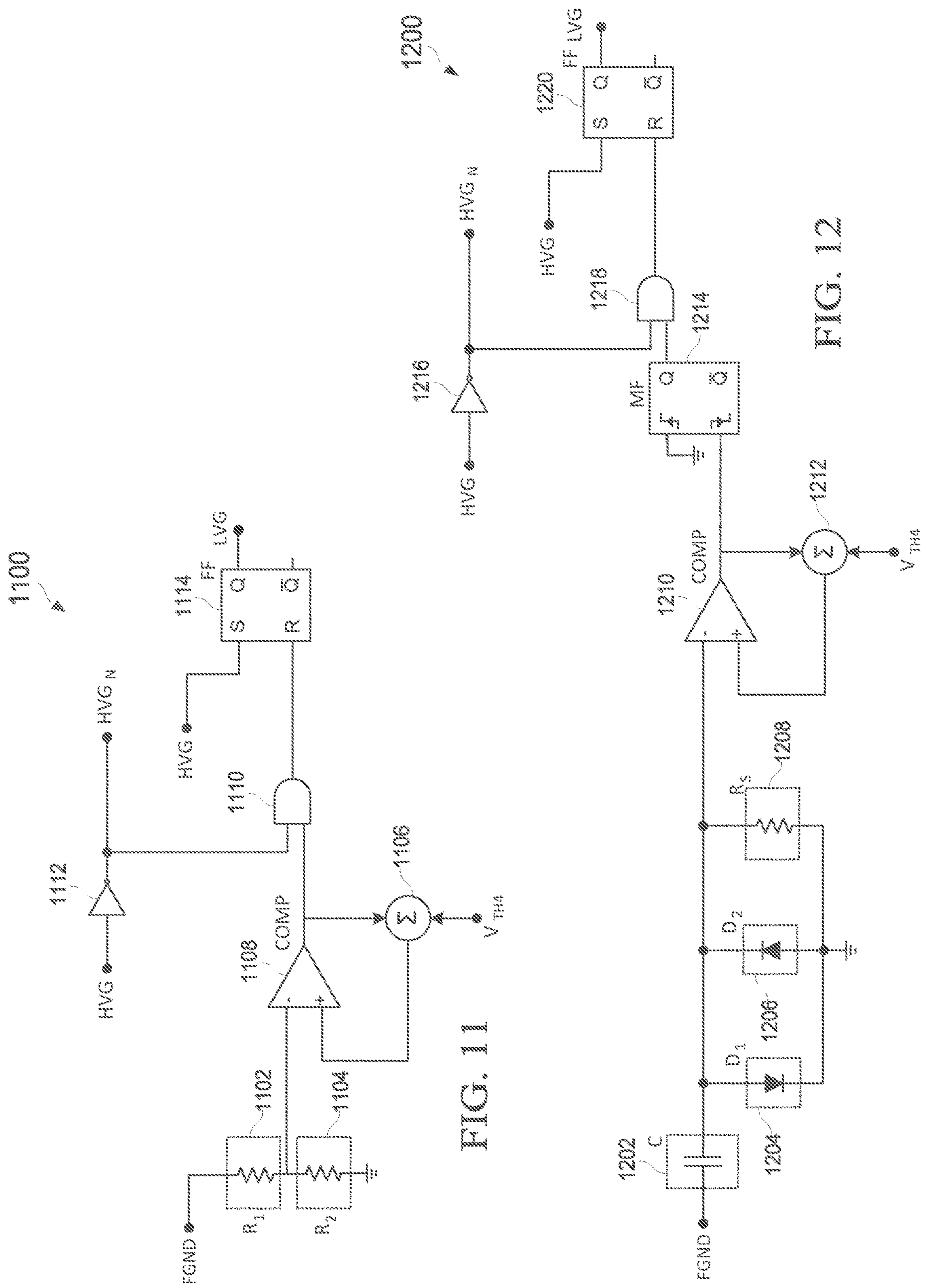
FIG. 11 is a schematic of an embodiment DDS circuit that can be implemented in the dual-switch flyback converter based on the method of FIG. 9.
FIG. 12 is a schematic of another embodiment DDS circuit that can be implemented in the dual-switch flyback converter based on the method of FIG. 9.

FIG. 11 illustrates a schematic of an embodiment DDS circuit 1100 that can be implemented in the dual-switch flyback converter 200 based on method 900. DDS circuit 1100 includes a first resistor ($R_1$) 1102, a second resistor ($R_2$) 1104, an adder circuit 1106, a comparator (COMP) 1108, an AND gate 1110, an inverter 1112, and a flip-flop (FF) 1114, which may (or may not) be arranged as shown. DDS circuit 1100 may include additional components not shown, such as filter circuits. The input of the DDS circuit 1100 is coupled to the floating ground (FGND) node of the dual-switch flyback converter 200.

Comparator (COMP) 1108 is configured to effectively compare the voltage ($V_{FGND}$) at the floating ground (FGND) node through the voltage divider (i.e., voltage divider comprising the first resistor ($R_1$) 1102 and the second resistor ($R_2$) 1104) against the fourth threshold voltage ($V_{TH4}$). As noted in method 900, voltage ($V_{FGND}$) at the floating ground (FGND) node is monitored against the fourth threshold voltage ($V_{TH4}$) and in response to detecting the voltage ($V_{FGND}$) at the floating ground (FGND) node falling below the fourth threshold voltage ($V_{TH4}$), after the internal delay from, for example, the delay introduced by the comparator (COMP) 1108, the low-side switch ($Q_2$) 204 is deactivated. In embodiments, the fourth threshold voltage ($V_{TH4}$) is 1 V.

Comparator (COMP) 1108 is configured with hysteresis-provided from the output of the comparator (COMP) 1108. Comparator (COMP) 1108 has an inverting input (-) configured to receive the voltage at the voltage ($V_{FGND}$) at the floating ground (FGND) node. The non-inverting input of the comparator (COMP) 1108 is coupled to the output of the adder circuit 1106.

The adder circuit 1106 has a first input configured to receive the fourth threshold voltage ($V_{TH4}$). A second input of the adder circuit 1106 is configured to receive the output of the comparator (COMP) 1108. Comparator (COMP) 1108 generates an output signal fed to the first input of the AND gate 1110.

The inverter 1112 inverts the high-side signal (HVG) to generate an inverted high-side signal ($HVG_N$). Thus, when the high-side switch ($Q_1$) 202 is deactivated, the inverted high-side signal ($HVG_N$) is at a logic level high. The second input of the AND gate 1110 is coupled to the inverted high-side signal ($HVG_N$).

Accordingly, when (i) the high-side switch ($Q_1$) 202 is deactivated and (ii) the voltage ($V_{FGND}$) at the floating ground (FGND) node falls below the fourth threshold voltage ($V_{TH4}$), the output of the AND gate 1110 is at a logic level high, which is provided to the Reset (R) input of the flip-flop (FF) 1114. As the Set(S) input of the flip-flop (FF) 1114 is at a logic level low (i.e., high-side signal (HVG) is at a logic level low), the flip-flop (FF) 1114 is reset, and the output (Q) of the flip-flop (FF) 1114 goes low. The output (Q) of the flip-flop (FF) 1114 is provided as the low-side signal (LVG) to the control terminal of the low-side switch ($Q_2$) 204.

FIG. 12 illustrates a schematic of another embodiment DDS circuit 1200 that can be implemented in the dual-switch flyback converter 200 based on method 900. In the DDS circuit 1200, a differential voltage is sensed corresponding to the swing of the voltage ($V_{FGND}$) at the floating ground (FGND) node.

DDS circuit 1200 includes a capacitor (C) 1202, a first diode ($D_1$) 1204, a second diode ($D_1$) 1206, a sense resistor ($R_S$) 1208, a comparator (COMP) 1210, an adder circuit 1212, a mono-flop (MF) 1214, an inverter 1216, an AND gate 1218, and a flip-flop (FF) 1220, which may (or may not) be arranged as shown. DDS circuit 1200 may include additional components not shown, such as filter circuits. The input of the DDS circuit 1200 is coupled to the floating ground (FGND) node of the dual-switch flyback converter 200.

Comparator (COMP) 1210 is configured to effectively compare the voltage ($V_{FGND}$) at the floating ground (FGND) node through the capacitor (C) 1202, a first diode ($D_1$) 1204, a second diode ($D_1$) 1206, a sense resistor ($R_S$) 1208 against the fourth threshold voltage ($V_{TH4}$). As noted in method 900, voltage ($V_{FGND}$) at the floating ground (FGND) node is monitored against the fourth threshold voltage ($V_{TH4}$) and in response to detecting the voltage ($V_{FGND}$) at the floating ground (FGND) node falling below the fourth threshold voltage ($V_{TH4}$), after the internal delay from, for example, the delay introduced by the comparator (COMP) 1210, the low-side switch ($Q_2$) 204 is deactivated.

Comparator (COMP) 1210 is configured with hysteresis-provided from the output of the comparator (COMP) 1108. Comparator (COMP) 1210 has an inverting input (-) configured to receive the swing of the voltage ($V_{FGND}$) at the floating ground (FGND) node. The non-inverting input of the comparator (COMP) 1210 is coupled to the output of the adder circuit 1212.

The adder circuit 1212 has a first input configured to receive the fourth threshold voltage ($V_{TH4}$). A second input of the adder circuit 1212 is configured to receive the output of the comparator (COMP) 1210. Comparator (COMP) 1210 generates an output signal fed to the mono-flop (MF) 1214.

Mono-flop (MF) 1214 is configured to switch from a stable state to an unstable state for a predetermined period in response to being triggered and then automatically returns to the stable state. In embodiments, the mono-flop (MF) 1214 is arranged as a negative edge-triggered mono-flop.

In response to the swing of the voltage ($V_{FGND}$) at the floating ground (FGND) node, the negative edge signal (signal transitioning from a logic level high to a logic level low) from the comparator (COMP) 1210 triggers the mono-flop (MF) 1214, resulting in its change of state of and the generating of a logic level high signal for a duration (Δt) at its output (Q).

The inverter 11216 inverts the high-side signal (HVG) to generate an inverted high-side signal ($HVG_N$). Thus, when the high-side switch ($Q_1$) 202 is deactivated, the inverted high-side signal ($HVG_N$) is at a logic level high. The second input of the AND gate 1218 is coupled to the inverted high-side signal ($HVG_N$).

Accordingly, when (i) the high-side switch ($Q_1$) 202 is deactivated and (ii) the duration which the output (Q) of the mono-flop (MF) 1214 is at a logic level high, the output of the AND gate 1218 is at a logic level high, which is provided to the Reset (R) input of the flip-flop (FF) 1220. As the Set(S) input of the flip-flop (FF) 1220 is at a logic level low (i.e., high-side signal (HVG) is at a logic level low), the flip-flop (FF) 1220 is reset, and the output (Q) of the flip-flop (FF) 1220 goes low. The output (Q) of the flip-flop (FF) 1220 is provided as the low-side signal (LVG) to the control terminal of the low-side switch ($Q_2$) 204.

Figure 13:
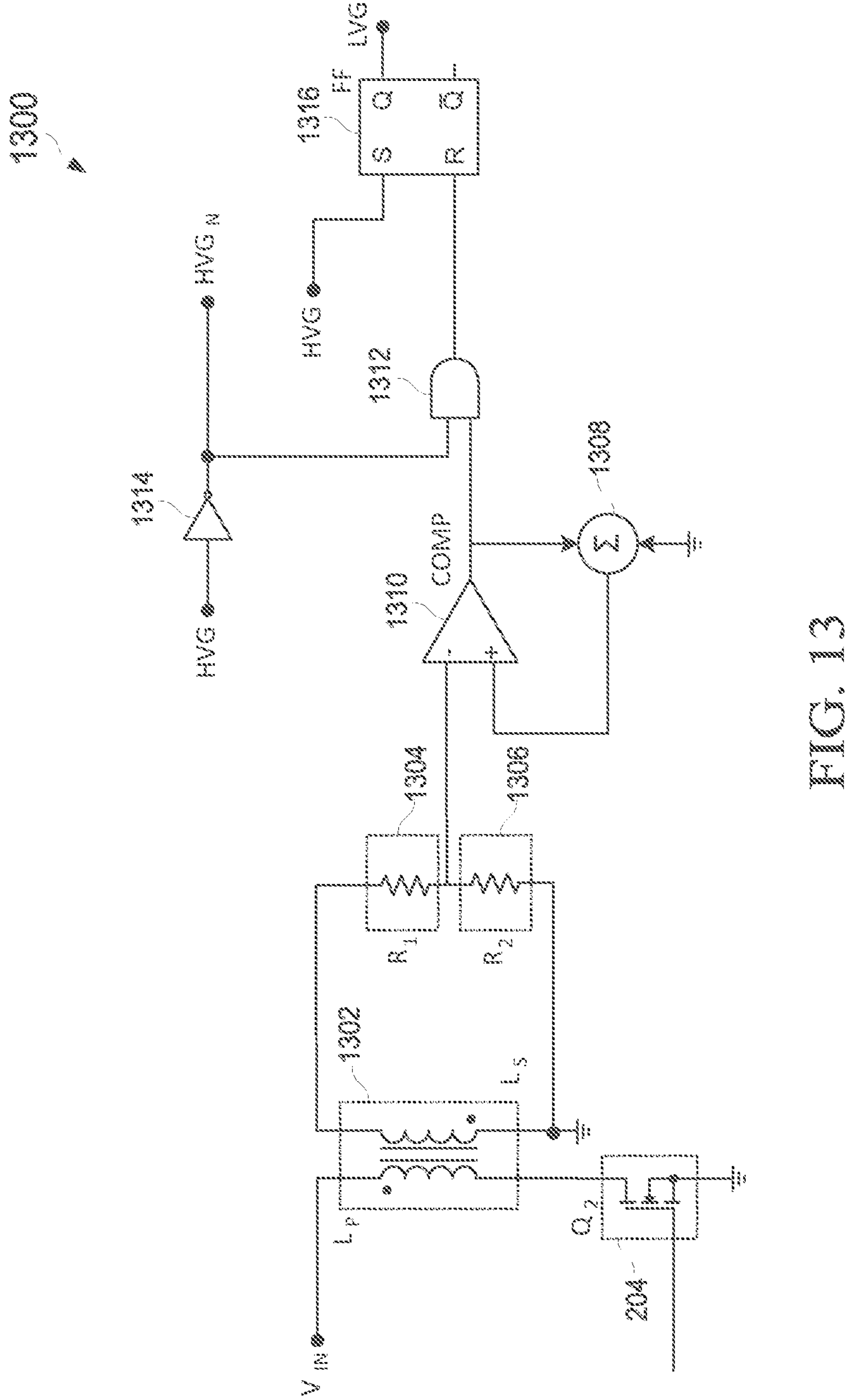
FIG. 13 is a schematic of an embodiment DDS circuit that can be implemented in the dual-switch flyback converter based on the method of FIG. 9.

FIG. 13 illustrates a schematic of an embodiment DDS circuit 1300 that can be implemented in the dual-switch flyback converter 200 based on method 900. In the DDS circuit 1300, the voltage across the auxiliary winding is sensed to set the delay between the turning OFF of the high-side switch ($Q_1$) 202 and the turning OFF of the low-side switch ($Q_2$) 204.

DDS circuit 1300 includes an auxiliary winding 1302, a first resistor ($R_1$) 1304, a second resistor ($R_2$) 1306, an adder circuit 1308, a comparator (COMP) 1310, an AND gate 1312, an inverter 1314, and a flip-flop (FF) 1316, which may (or may not) be arranged as shown. DDS circuit 1300 may include additional components not shown, such as filter circuits.

Typically, transformer 206 includes the auxiliary winding 1302, which is used to power the control loop and other components on the primary side of transformer 206. Comparator (COMP) 1310 is configured to sense the voltage across the auxiliary winding 1302 through the voltage divider (i.e., voltage divider comprising the first resistor ($R_1$) 1304 and the second resistor ($R_2$) 1306). Comparator (COMP) 1310 is configured with hysteresis-provided from the output of the comparator (COMP) 1310. Comparator (COMP) 1310 has an inverting input (-) configured to sense the voltage across the auxiliary winding 1302 through the voltage divider. The non-inverting input of the comparator (COMP) 1310 is coupled to the output of the adder circuit 1308.

The adder circuit 1308 has a first input coupled to the reference ground. A second input of the adder circuit 1308 is configured to receive the output of the comparator (COMP) 1310. Comparator (COMP) 1310 generates an output signal fed to the first input of the AND gate 1312.

The inverter 1314 inverts the high-side signal (HVG) to generate an inverted high-side signal ($HVG_N$). Thus, when the high-side switch ($Q_1$) 202 is deactivated, the inverted high-side signal ($HVG_N$) is at a logic level high. The second input of the AND gate 1312 is coupled to the inverted high-side signal ($HVG_N$).

Accordingly, when (i) the high-side switch ($Q_1$) 202 is deactivated and (ii) the comparator (COMP) 1310 generates a logic level high signal, the AND gate 1312 provides a logic level high signal to the Reset (R) input of the flip-flop (FF)

1316. As the Set(S) input of the flip-flop (FF) 1316 is at a logic level low (i.e., high-side signal (HVG) is at a logic level low), the flip-flop (FF) 1316 is reset, and the output (Q) of the flip-flop (FF) 1316 goes low. The output (Q) of the flip-flop (FF) 1316 is provided as the low-side signal (LVG) to the control terminal of the low-side switch ($Q_2$) 204.

Figure 14:
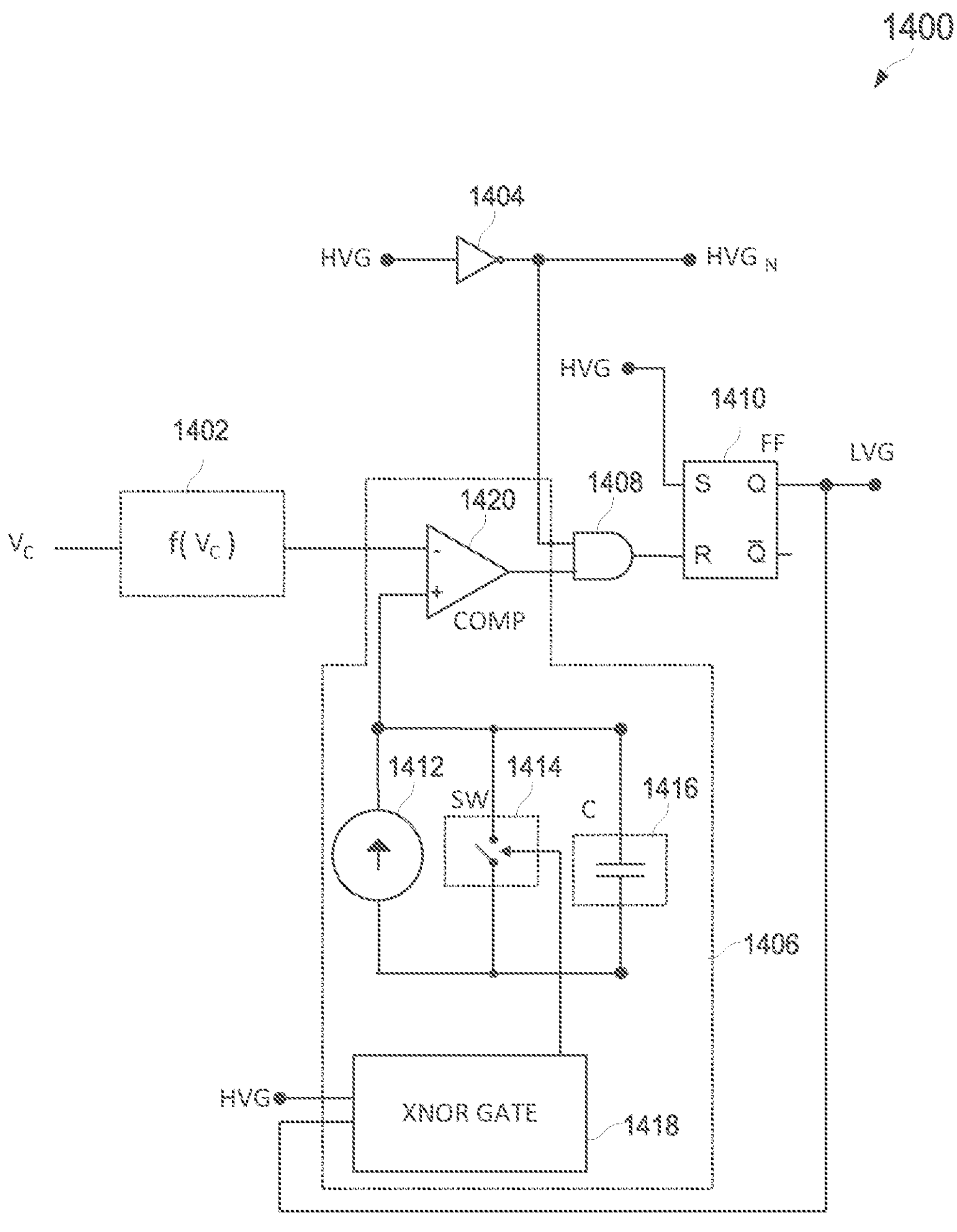
FIG. 14 is a schematic of an embodiment open-loop adjustment circuit that can be implemented in the dual-switch flyback converter based on the method of FIG. 10.

FIG. 14 illustrates a schematic of an embodiment open-loop adjustment circuit 1400 that can be implemented in the dual-switch flyback converter 200 based on method 1000. Open-loop adjustment circuit 1400 provides a timing circuit for the programmable delay as a function of the control voltage ($V_C$) of the feedback loop for regulating the output voltage ($V_{OUT}$). The control voltage ($V_C$) has a maximum value ($V_{CMAX}$) and a minimum value ($V_{CMIN}$).

The maximum value of the delay ($Delay_{MAX}$) corresponds to the minimum value ($V_{CMIN}$) of the control voltage ($V_C$), whereas the minimum value of the delay ($Delay_{MIN}$) corresponds to the maximum value ($V_{CMAX}$) of the control voltage ($V_C$). The delay values between the maximum value of the delay ($Delay_{MAX}$) and the minimum value of the delay ($Delay_{MIN}$), corresponding to a control voltage ($V_C$) between the minimum value ($V_{CMIN}$) and the maximum value ($V_{CMAX}$), can be determined using a linear function, a piecewise linear function, a lookup-table, an analog timer using an up-counter and a logic gate circuit generating a blanking signal at the input of the AND gate 1408, or the like. In embodiments, the maximum value of the delay ($Delay_{MAX}$) and the minimum value of the delay ($Delay_{MIN}$) are programmable based on the application. In embodiments, one or more parameters associated with the programmable delay are stored in a memory of a host device.

Open-loop adjustment circuit 1400 includes a function circuit 1402, an inverter 1404, a reverse current timer circuit 1406, an AND gate 1408, and a flip-flop (FF) 1410, which may (or may not) be arranged as shown. The open-loop adjustment circuit 1400 may include additional components not shown, such as filter circuits.

The function circuit 1402 is a decreasing monotonic function in the interval between the minimum value ($V_{CMIN}$) and the maximum value ($V_{CMAX}$) of the control voltage ($V_C$).

The reverse current timer circuit 1406 includes a fixed current generator 1412, a switch (SW) 1414, a capacitor (C) 1416, an XNOR gate 1418, and a comparator (COMP) 1420. Alternatively, in embodiments, the reverse current timer circuit 1406 is implemented digitally as an up-counter. In embodiments, the comparator (COMP) 1420 is implemented as a digital comparator.

The fixed current generator 1412 and the capacitor (C) 1416 provide a ramping voltage to the non-inverting input of the comparator (COMP) 1420. When the ramping voltage provided to the non-inverting input of the comparator (COMP) 1420 reaches the voltage level from X 1402, the first input of the AND gate 1408 is at a logic level high. In embodiments, the relationship between the current (I) provided by the fixed current generator 1412 and the capacitor (C) 1416 can be represented as: C/I=1 μs/V.

The inverter 1404 inverts the high-side signal (HVG) to generate an inverted high-side signal ($HVG_N$). Thus, when the high-side switch ($Q_1$) 202 is deactivated, the inverted high-side signal ($HVG_N$) is at a logic level high. The second input of the AND gate 1408 is coupled to the inverted high-side signal ($HVG_N$).

Accordingly, when (i) the high-side switch ($Q_1$) 202 is deactivated and (ii) the comparator (COMP) 1420 generates a logic level high signal corresponding to the output of the function circuit 1402, the AND gate 1408 provides a logic level high signal to the Reset (R) input of the flip-flop (FF) 1410. As the Set(S) input of the flip-flop (FF) 1410 is at a logic level low (i.e., high-side signal (HVG) is at a logic level low), the flip-flop (FF) 1410 is reset, and the output (Q) of the flip-flop (FF) 1410 goes low. The output (Q) of the flip-flop (FF) 1410 is provided as the low-side signal (LVG) to the control terminal of the low-side switch ($Q_2$) 204.

Figure 15:
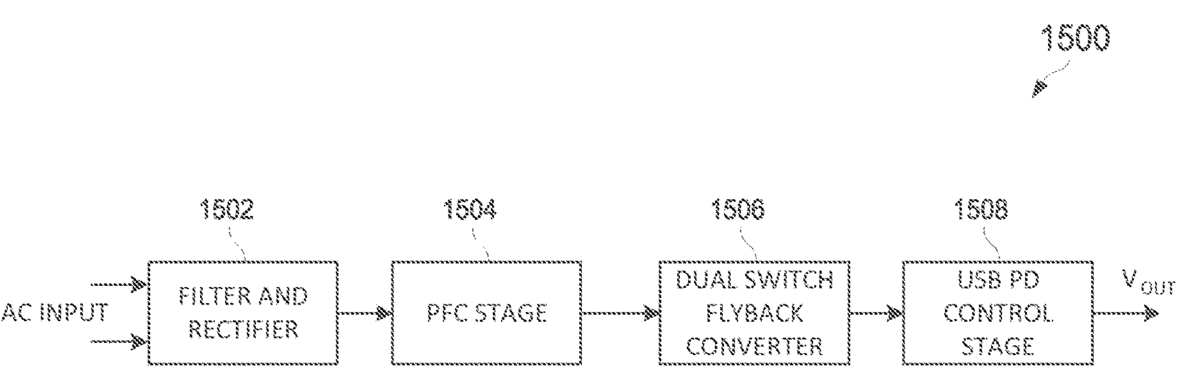
FIG. 15 is a block diagram of an embodiment system.

FIG. 15 illustrates a block diagram of an embodiment system 1500. In embodiments, system 1500 includes a filter and rectifier circuit 1502, an optional Power Factor Correction (PFC) stage circuit 1504, a dual-switch flyback converter 1506, and a USB PD Control stage circuit 1508, which may (or may not) be arranged as shown. System 1500 may include additional components not shown. In embodiments, system 1500 is a high-density USB-C charger used to charge, for example, a mobile device or the like.

The filter and rectifier circuit 1502 is configured to receive the alternating current (AC) input from a power source. The filter and rectifier circuit 1502 filters out noise and unwanted frequencies from the AC input and converts it into direct current (DC).

The PFC stage circuit 1504 ensures that the voltage and current waveforms are aligned to maximize the power transfer efficiency. The PFC stage circuit 1504 is generally required for input power levels greater than 75 watts (W).

The dual-switch flyback converter 1506 converts the DC output from the PFC stage circuit 1504 to another DC level suitable for the USB PD Control stage circuit 1508. In embodiments, the dual-switch flyback converter 1506 is implemented as the dual-switch flyback converter 200 with the closed-loop adjustment circuit 600, 700, 800 and operated using method 500. In embodiments, the dual-switch flyback converter 1506 is implemented as the dual-switch flyback converter 200 with the DDS circuit 1100, 1200, 1300 and operated using method 900. In embodiments, the dual-switch flyback converter 1506 is implemented as the dual-switch flyback converter 200 with the open-loop adjustment circuit 1400 and operated using method 1000.

The USB PD Control stage circuit 1508 regulates and controls the power via the output voltage ($V_{OUT}$) delivered to a USB-C device.

A first aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is delayed after a duration from a transitioning of the first control signal to turn OFF the high-side switch, wherein the delay is automatically adjusted by detecting a condition associated with the converter, wherein the delay begins in response to a voltage at the floating ground node being less than zero.

In a first implementation form of the converter according to the first aspect as such, the converter further includes a closed-loop adjustment circuit configured to monitor a voltage across the bootstrap capacitor.

In a second implementation form of the converter according to the first aspect as such or any preceding implementation form of the first aspect, the delay is decreased in response to detecting that the voltage across the bootstrap capacitor is greater than a threshold voltage using the closed-loop adjustment circuit, and wherein the delay is increased in response to detecting that the voltage across the bootstrap capacitor is less than the threshold voltage using the closed-loop adjustment circuit.

In a third implementation form of the converter according to the first aspect as such or any preceding implementation form of the first aspect, the converter further includes a diode having a cathode terminal coupled to the bootstrap capacitor; and a closed-loop adjustment circuit configured to monitor a difference between a regulated voltage at an anode terminal of the diode and a voltage across the bootstrap capacitor.

In a fourth implementation form of the converter according to the first aspect as such or any preceding implementation form of the first aspect, the delay is decreased in response to detecting that the difference between the regulated voltage and the voltage across the bootstrap capacitor is less than a threshold voltage using the closed-loop adjustment circuit. The delay is increased in response to detecting that the difference between the regulated voltage and the voltage across the bootstrap capacitor is greater than the threshold voltage using the closed-loop adjustment circuit.

In a fifth implementation form of the converter according to the first aspect as such or any preceding implementation form of the first aspect, the converter further includes a closed-loop adjustment circuit configured to monitor a voltage at the floating ground node for $\tau_1$ seconds within a $\tau_2$ second period immediately after the high-side switch is turned OFF.

In a sixth implementation form of the converter according to the first aspect as such or any preceding implementation form of the first aspect, the delay is decreased in response to detecting, by the closed-loop-adjustment circuit, that the voltage at the floating ground node for the $\tau_1$ seconds within the $\tau_2$ second period immediately after the high-side switch is turned OFF is less than a threshold, and wherein the delay is increased in response to detecting, by the closed-loop-adjustment circuit, that the voltage at the floating ground for the $\tau_1$ seconds within the $\tau_2$ second period immediately after the high-side switch is turned OFF is greater than a threshold.

A second aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is based on detecting a condition associated with the converter after a transitioning of the first control signal to turn OFF the high-side switch.

In a first implementation form of the converter according to the second aspect as such, the converter further includes a circuit configured to monitor a voltage at the floating ground node.

In a second implementation form of the converter according to the second aspect as such or any preceding implementation form of the second aspect, the controller is configured to set the second control signal to turn OFF the low-side switch in response to detecting, by the circuit, that the voltage at the floating ground node is less than a threshold.

In a third implementation form of the converter according to the second aspect as such or any preceding implementation form of the second aspect, the converter further includes a diode having a cathode terminal coupled to the bootstrap capacitor; and a circuit configured to monitor a voltage across the bootstrap capacitor and a regulated voltage at an anode terminal of the diode.

In a fourth implementation form of the converter according to the second aspect as such or any preceding implementation form of the second aspect, the controller is configured to set the second control signal to turn OFF the low-side switch in response to detecting, by the circuit, that the voltage across the bootstrap capacitor is less than the regulated voltage.

In a fifth implementation form of the converter according to the second aspect as such or any preceding implementation form of the second aspect, the controller is configured to set the first control signal and the second control signal to simultaneously turn ON the high-side switch and the low-side switch.

In a sixth implementation form of the converter according to the second aspect as such or any preceding implementation form of the second aspect, the converter further includes an auxiliary winding for controlling a feedback loop of the converter based on an output voltage of the converter; and a circuit configured to sense a voltage of the auxiliary winding, wherein the controller is configured to set the second control signal to turn OFF the low-side switch in response to detecting, by the circuit, that the voltage at the auxiliary winding is less than a threshold.

A third aspect relates to a converter. The converter includes a bootstrap capacitor having a first terminal coupled to a floating ground node; a high-side switch, a source terminal of the high-side switch coupled to the bootstrap capacitor through the floating ground node; a low-side switch; and a controller. The controller is configured to provide a first control signal to a control terminal of the high-side switch, and a second control signal to a control terminal of the low-side switch, wherein a transitioning of the second control signal to turn OFF the low-side switch is based on a programmable delay after a transitioning of the first control signal to turn OFF the high-side switch, the programmable delay being a function of a maximum current flowing through a transformer of the converter.

In a first implementation form of the converter according to the third aspect as such, the maximum current flowing through the transformer is related to a load at an output of the converter.

In a second implementation form of the converter according to the third aspect as such or any preceding implementation form of the third aspect, a first duration of the programmable delay in response to a first load is greater than a second duration of the programmable delay in response to a second load greater than the first load.

In a third implementation form of the converter according to the third aspect as such or any preceding implementation form of the third aspect, the converter further includes an open-loop adjustment circuit configured to set the programmable delay based on a lookup-table as a function of a control voltage in a feedback loop mechanism used to control the operation of the converter.

In a fourth implementation form of the converter according to the third aspect as such or any preceding implementation form of the third aspect, a maximum value of the programmable delay corresponds to a minimum value of the control voltage, and wherein a minimum value of the programmable delay corresponds to a maximum value of the control voltage.

In a fifth implementation form of the converter according to the third aspect as such or any preceding implementation form of the third aspect, a value of the programmable delay is based on a value of the control voltage in between the minimum value of the control voltage and the maximum value of the control voltage using a look-up table, a linear relationship, or a piecewise liner relationship.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A converter, comprising:

a bootstrap capacitor having a first terminal coupled to a floating ground node;

a high-side switch, a source terminal of the high-side switch coupled to the bootstrap capacitor through the floating ground node;

a low-side switch; and a controller configured to:

provide a first control signal to a control terminal of the high-side switch, and provide a second control signal to a control terminal of the low-side switch, wherein a transitioning of the second control signal to turn OFF the low-side switch is delayed after a duration from a transitioning of the first control signal to turn OFF the high-side switch, wherein the delay is decreased in response to a voltage across the bootstrap capacitor being greater than a threshold voltage, wherein the delay is increased in response to the voltage across the bootstrap capacitor being less than the threshold voltage, and wherein the delay begins in response to a voltage at the floating ground node being less than zero.

2. The converter of claim 1, further comprising a closed-loop adjustment circuit configured to monitor the voltage across the bootstrap capacitor.

3. The converter of claim 2, wherein the delay is decreased in response to detecting that the voltage across the bootstrap capacitor is greater than the threshold voltage using the closed-loop adjustment circuit, and wherein the delay is increased in response to detecting that the voltage across the bootstrap capacitor is less than the threshold voltage using the closed-loop adjustment circuit.

4. The converter of claim 1, further comprising a closed-loop adjustment circuit configured to monitor the voltage across the bootstrap capacitor and compare the voltage across the bootstrap capacitor against the threshold voltage, wherein the delay between the transitioning of the first control signal to turn OFF the high-side switch and the transitioning of the second control signal to turn OFF the low-side switch is automatically adjusted.

5. The converter of claim 4, wherein the closed-loop adjustment circuit comprises a comparator configured to compare the voltage across the bootstrap capacitor against the threshold voltage and generate an output signal based on the comparison, and wherein the output signal is used to adjust an End-of-Count counter value that determines the duration of the delay.

6. The converter of claim 5, wherein the End-of-Count counter value is decreased by one step in response to detecting that the voltage across the bootstrap capacitor is greater than the threshold voltage, and wherein the End-of-Count counter value is increased by k steps in response to detecting that the voltage across the bootstrap capacitor is less than the threshold voltage, where k is an integer greater than one.

7. The converter of claim 5, wherein the closed-loop adjustment circuit further comprises a reverse current timer programming circuit and a reverse current timer circuit, wherein the reverse current timer programming circuit generates a reference voltage based on the End-of-Count counter value, and wherein the reverse current timer circuit generates a ramping voltage that is compared against the reference voltage to determine when the low-side switch is turned OFF.

8. A method for operating a converter comprising a bootstrap capacitor, a high-side switch, and a low-side switch, the bootstrap capacitor having a first terminal coupled to a floating ground node, the high-side switch having a source terminal coupled to the bootstrap capacitor through the floating ground node, the method comprising:

generating a first control signal at a control terminal of the high-side switch; and generating a second control signal at a control terminal of the low-side switch, wherein a transitioning of the second control signal to turn OFF the low-side switch is delayed after a duration from a transitioning of the first control signal to turn OFF the high-side switch, wherein the delay is decreased in response to a voltage across the bootstrap capacitor being greater than a threshold voltage, wherein the delay is increased in response to the voltage across the bootstrap capacitor being less than the threshold voltage, and wherein the delay begins in response to a voltage at the floating ground node being less than zero.

9. The method of claim 8, wherein the converter further comprises a closed-loop adjustment circuit, the method further comprising monitoring, by the closed-loop adjustment circuit, the voltage across the bootstrap capacitor.

10. The method of claim 9, wherein the delay is decreased in response to detecting that the voltage across the bootstrap capacitor is greater than the threshold voltage using the closed-loop adjustment circuit, and wherein the delay is increased in response to detecting that the voltage across the bootstrap capacitor is less than the threshold voltage using the closed-loop adjustment circuit.

11. The method of claim 8, wherein the converter further comprises a closed-loop adjustment circuit configured to monitor the voltage across the bootstrap capacitor and compare the voltage across the bootstrap capacitor against the threshold voltage, wherein the delay between the transitioning of the first control signal to turn OFF the high-side switch and the transitioning of the second control signal to turn OFF the low-side switch is automatically adjusted.

12. The method of claim 11, wherein the closed-loop adjustment circuit comprises a comparator configured to compare the voltage across the bootstrap capacitor against the threshold voltage and generate an output signal based on the comparison, and wherein the output signal is used to adjust an End-of-Count counter value that determines the duration of the delay.

13. The method of claim 12, wherein the End-of-Count counter value is decreased by one step in response to detecting that the voltage across the bootstrap capacitor is greater than the threshold voltage, and wherein the End-of-Count counter value is increased by k steps in response to detecting that the voltage across the bootstrap capacitor is less than the threshold voltage, where k is an integer greater than one.

14. The method of claim 12, wherein the closed-loop adjustment circuit further comprises a reverse current timer programming circuit and a reverse current timer circuit, wherein the reverse current timer programming circuit generates a reference voltage based on the End-of-Count counter value, and wherein the reverse current timer circuit generates a ramping voltage that is compared against the reference voltage to determine when the low-side switch is turned OFF.

15. A controller for operating a converter comprising a bootstrap capacitor, a high-side switch, and a low-side switch, the bootstrap capacitor having a first terminal coupled to a floating ground node, the high-side switch having a source terminal coupled to the bootstrap capacitor through the floating ground node, the controller configured to:

provide a first control signal to a control terminal of the high-side switch, and provide a second control signal to a control terminal of the low-side switch, wherein a transitioning of the second control signal to turn OFF the low-side switch is delayed after a duration from a transitioning of the first control signal to turn OFF the high-side switch, wherein the delay is decreased in response to a voltage across the bootstrap capacitor being greater than a threshold voltage, wherein the delay is increased in response to the voltage across the bootstrap capacitor being less than the threshold voltage, and wherein the delay begins in response to a voltage at the floating ground node being less than zero.

16. The controller of claim 15, further comprising a closed-loop adjustment circuit configured to monitor the voltage across the bootstrap capacitor.

17. The controller of claim 16, wherein the delay is decreased in response to detecting that the voltage across the bootstrap capacitor is greater than the threshold voltage using the closed-loop adjustment circuit, and wherein the delay is increased in response to detecting that the voltage across the bootstrap capacitor is less than the threshold voltage using the closed-loop adjustment circuit.

18. The controller of claim 15, further comprising a closed-loop adjustment circuit configured to monitor the voltage across the bootstrap capacitor and compare the voltage across the bootstrap capacitor against the threshold voltage, wherein the delay between the transitioning of the first control signal to turn OFF the high-side switch and the transitioning of the second control signal to turn OFF the low-side switch is automatically adjusted.

19. The controller of claim 18, wherein the closed-loop adjustment circuit comprises a comparator configured to compare the voltage across the bootstrap capacitor against the threshold voltage and generate an output signal based on the comparison, and wherein the output signal is used to adjust an End-of-Count counter value that determines the duration of the delay.

20. The controller of claim 19, wherein the End-of-Count counter value is decreased by one step in response to detecting that the voltage across the bootstrap capacitor is greater than the threshold voltage, and wherein the End-of-Count counter value is increased by k steps in response to detecting that the voltage across the bootstrap capacitor is less than the threshold voltage, where k is an integer greater than one.

* * * * *